US006965438B2

(12) United States Patent
Lee et al.

(10) Patent No.: US 6,965,438 B2
(45) Date of Patent: Nov. 15, 2005

(54) VEHICLE MEASURING APPARATUS AND METHOD FOR TOLL COLLECTION SYSTEM

(75) Inventors: Sang-Jean Lee, Incheon (KR); In-June Song, Ansan (KR); Dae-Woon Lim, Anyang (KR); Joon-Suk Jun, Suwon (KR)

(73) Assignee: LG Industrial Systems Co., Ltd., Seoul (KR)

( * ) Notice: Subject to any disclaimer, the term of this patent is extended or adjusted under 35 U.S.C. 154(b) by 369 days.

(21) Appl. No.: 10/316,002

(22) Filed: Dec. 11, 2002

(65) Prior Publication Data

US 2004/0008514 A1 Jan. 15, 2004

(30) Foreign Application Priority Data

Jul. 9, 2002 (KR) ..................... 10-2002-0039796

(51) Int. Cl.[7] .............................................. G01B 11/04
(52) U.S. Cl. ...................... 356/625; 340/942; 356/634; 356/635
(58) Field of Search ..................... 356/4.01, 5.01–5.15, 356/625, 627, 634–635; 340/933, 942

(56) References Cited

U.S. PATENT DOCUMENTS

| | | | | | |
|---|---|---|---|---|---|
| 4,417,817 | A | * | 11/1983 | Bohme et al. | 356/627 |
| 4,770,526 | A | * | 9/1988 | Manhart et al. | 356/5.07 |
| 4,905,512 | A | * | 3/1990 | Hayashi | 356/627 |
| 5,870,180 | A | * | 2/1999 | Wangler | 356/4.01 |
| 6,212,468 | B1 | * | 4/2001 | Nakayama et al. | 340/933 |
| 6,504,602 | B1 | * | 1/2003 | Hinderling | 356/5.1 |
| 6,614,536 | B1 | * | 9/2003 | Doemens et al. | 356/601 |

* cited by examiner

*Primary Examiner*—Richard A. Rosenberger
(74) *Attorney, Agent, or Firm*—Birch, Stewart, Kolasch & Birch, LLP

(57) ABSTRACT

Vehicle measuring apparatus and method are disclosed to accurately measure height and width of a vehicle moving at a high speed. The vehicle measuring apparatus includes: a plurality of laser sensors separated from the road surface with a predetermined height and installed closely to each other corresponding to width of every roadway on the road, and receiving a reflection light of a laser light emitted onto the road from the plurality of the laser sensors and outputting a vehicle measurement signal; and a processor means electrically connected to the laser sensors and calculating height and width of the vehicle on the basis of the signal to measure the vehicle and previously stored installation information of the plurality of laser sensors.

21 Claims, 17 Drawing Sheets

VEHICLE MEASURING APPARATUS AND METHOD FOR TOLL COLLECTION SYSTEM

BACKGROUND OF THE INVENTION

1. Field of the Invention

The present invention relates to a toll collection system in a toll road for vehicles and, more particularly, to a vehicle measuring apparatus using a laser sensor suitably applied to the system.

2. Description of the Background Art

Recently, attempts to introduce an intelligent traffic system are being made throughout the world. For example, an electronic toll collection system (abbreviated as ETCS), an automatic toll collection system is being introduced which is capable of reducing product delivery cost and an environment pollution through mitigation of vehicle congestion in tollgate as occurring in the current manual Toll Collection System (abbreviated as TCS), and reducing operation and maintenance cost and improving a service through a toll collecting automation.

The electronic toll collection system is collecting a toll by using a Dedicated Small Region Communication (abbreviated as DSRC) wirelessly while a vehicle is running without stop when the vehicle passes a tollgate. However, with only the wireless communication, there is no way to discriminate a toll paid vehicle and a non-paid vehicle. For example, if a large bus equipped with an OVU (On Vehicle Unit: a terminal installed in a vehicle for a radio communication and toll payment) of a small-scale car passes the automatic toll payment system, it is not discernible whether a small car has passed the system or a large bus has passed the system.

Thus, in order to improve such a problem, a car classification device to classify the car and the DSRC for the radio communication are required.

The car classification device detects a violated car and a normal car by measuring at least a height and a width of a car travelling on a road out of a width, a height and a length, discriminating the type of the car by using the measurement result and checking the car type information and radio communication information. Here, the violated car can be a large bus equipped with an OVU of a small car.

The car classification device for vehicles travelling on the road is divided into a contact type and a non-contact type depending on whether it contacts a detection target. The contact type is to classify a type of car by using a pressure of a wheel of the car, while the non-contact type uses a photo sensor, a CCD (Charge Coupled Device) camera or a laser sensor in its classification.

The conventional contact type vehicle measuring apparatus will now be described with reference to FIG. 1.

FIG. 1 is a perspective view of a vehicle measuring apparatus using a tread-board sensor.

As shown in FIG. 1, the contact type vehicle measuring apparatus includes a resistor contact type tread-board sensor. The tread-board sensor 110 is buried under the surface of the road on which the vehicle travels and measures a change of resistance according to a wheel pressure of the running vehicle, to thereby measure the number of wheel shafts, a distance from front wheels to rear wheels, a distance between front wheels or rear wheels, so called wheel width, to classify the vehicle type.

However, with the conventional contact type vehicle measuring apparatus using the tread-board, it is impossible to measure a vehicle travelling faster than a certain velocity. In addition, in order to guide the vehicle to pass the surface in which the tread-board is buried, an induction facility such as a traffic island should be installed, for which thus an installation space should be provided on the road.

A non-contact type vehicle measuring apparatus to improve the problem of the contact type vehicle measuring apparatus will now be described with reference to FIGS. 2A and 2B. There are methods for using a photo sensor, a CCD camera and a laser beam for the non-contact type vehicle measuring apparatus.

FIG. 2A illustrates a construction of the non-contact type vehicle measuring apparatus using a photo sensor in accordance with a conventional art.

As shown in FIG. 2A, the non-contact type vehicle measuring apparatus using the photo sensor uses a photo sensor in which a light emitting unit and a light receiving unit are separately constructed. That is, the light emitting unit 211 and a light receiving unit 212 constituting the photo sensor are installed a both sides or upside and downside of the road to measure vehicles according to shielding of a light signal by the vehicle. However, the non-contact type vehicle measuring apparatus using the photo sensor does not possibly measure a height or a width of the vehicle but sense only the entry of a vehicle, and as such, it is not usable for a vehicle type classification and toll collection system.

FIG. 2B illustrates a construction of another non-contact type vehicle measuring apparatus using a photo sensor in accordance with a conventional art.

As shown in FIG. 2B, another non-contact type vehicle measuring apparatus uses a photo sensor with a light receiving unit and a light emitting unit constructed as one body. This non-contact type vehicle measuring apparatus includes a few photo sensors 221 installed with predetermined intervals on a gantry 223 to face the ground and a detection line 222 drawn in a predetermined pattern on the road corresponding to the photo sensors 221. Since a reflection light changes sensitively over a color of a subject due to characteristics of the light signal, the non-contact type vehicle measuring apparatus is operated not to measure the reflection light reflected from an entering vehicle but to measure a reflection light of a portion of the detection line 222 which is not shaded by the vehicle.

Thus, the non-contact type vehicle measuring apparatus measures the width of the vehicle by using the reflection light difference form the detection line 222 between when the vehicle is in absent and when the vehicle passes. In this respect, the detection line 222 can be constructed with a pattern region such as speckled pattern.

However, this non-contact type vehicle measuring apparatus has problems that its accuracy in measurement can be severely degraded if the detection line 222 is damaged or light scatters due to rain or snow.

FIG. 3 illustrates a construction of a vehicle measuring apparatus using the CCD camera in accordance with the conventional art.

As shown in FIG. 3, the vehicle measuring apparatus using CCD camera includes an intermittent marking pattern 312 drawn on the road surface and a plurality of first-dimensional CCD cameras 311 installed with predetermined intervals on the gantry 323 and obtaining a first-dimensional light amount signal from the intermittent marking pattern 312. That is, the vehicle measuring apparatus using CCD camera searches only the shaded portion of the intermittent marking pattern 312 of an image signal obtained by the CCD camera 311 when a vehicle is entering, to detect a vehicle and measure a width of the vehicle.

However, the vehicle measuring apparatus using CCD camera 331 has problems that it can not obtain accurately an image of the vehicle and thus cause a serious measurement error if the intermittent marking pattern 312 is damaged or the amount of light reflected from the intermittent marking pattern 312 changes due to clouds.

Thus, in order to improve an error according to the change of the light amount as described with respect to the apparatus of FIGS. 2A–2B and FIG. 3, a vehicle measuring apparatus using a laser distance sensor will now be described with reference to FIG. 4.

FIG. 4 is a perspective view showing a vehicle measuring apparatus using a laser distance sensor in accordance with the conventional art.

As shown in FIG. 4, the vehicle measuring apparatus using a laser distance sensor includes laser distance sensors 410 installed as many as the number of roadways on the road surface. Each laser distance sensor 410 independently performs a detecting operation to measure a height and a width of a vehicle passing each roadway.

The construction of the laser distance sensor 410 will now be described with reference to FIG. 5.

FIG. 5 is a view showing the construction of the laser distance sensor illustrated in FIG. 4.

As shown in FIG. 5, the laser distance sensor 410 includes a laser emitting/receiving unit 511, a polygonal diffraction lattice for reflecting a laser beam emitted from the laser emitting/receiving unit 511 or a laser beam received after being reflected from an object on the road into several angles while being rotated at a equal speed; and a reflection plate 512 for reflecting the laser beam emitted from the laser emitting/receiving unit 511 or reflecting the laser beam reflected by the diffraction lattices after being reflected from the object on the road to the laser emitting/receiving unit 511.

That is, as for the laser distance sensor 410, since the laser beam is not sensitive to the color of the subject due to the characteristics of laser light and has a straight traveling property, the time taken for the laser beam emitted from the light emitting unit to meet the object, be reflected and come back is measured by the light receiving unit, and then the distance is measured by using the measured time.

The operation of the laser distance sensor 410 will now be described with reference to FIGS. 6A, 6B, 7A and 7B.

FIGS. 6A and 6B show a vehicle detection region using the laser distance sensor of FIG. 5.

FIGS. 7A and 7B are views showing a problem caused when detecting a vehicle by using the laser distance sensor of FIG. 5.

First, in case that the vehicle is normally travelling in the roadway, when the laser emitting/receiving unit 511 irradiates a pulse laser beam emitted from the internal light emitting unit to the diffraction lattice 513 through the reflection plate 512, the laser beam is reflected in a direction by the polygonal diffraction lattice 513. The reflected laser beam is reached on the surface of the vehicle.

Thereafter, the reached laser light is reflected from the surface of the vehicle, which is reached on the light receiving unit of the laser emitting/receiving unit 511 through the reflection plate 512 by the polygonal diffraction lattice 513. At this time, the laser emitting/receiving unit 511 processes the beam reached on the internal light receiving unit and measure a distance for a single point.

After the distance for the single point is completely measured, the diffraction lattice 513 is rotated as much as a predetermined angle.

A laser beam of another pulse emitted from the light emitting unit of the laser emitting/receiving unit 511 is emitted through the diffraction lattice 513 and a reception signal for the laser beam of the emitted pulse is reached onto the light receiving unit of the laser emitting/receiving unit 511 through the diffraction lattice 513, so that a distance for another one point can be measured.

Therefore, by repeatedly performing the operation by rotating the polygonal diffraction lattice 513 which is already aware of the angle from the distance measurement on one of reflection points, it is possible to measure a particular region. In other words, since the vehicle measuring apparatus using a laser distance sensor is a method of irradiating one laser beam to a specific region by using the diffraction lattice 513 in measuring the width of the vehicle, the laser beam has a form of being radiated toward outside on the basis of a starting point, so that the width of the vehicle is measured in the unit of angle as shown in FIG. 6.

In the case that the vehicle type classification reference for the ETCS is provided as the length information such as width, length and height of the vehicle, since the angle value can not be directly used, a process for converting the unit of angle into a unit of length is required. That is, on the assumption that a height from the road surface to the laser distance sensor 410 is h1, a height of the detected vehicle is h2, and an angle of the width of the detected vehicle is ‘r’, a width of the vehicle (w1) is calculated by equation (1) as below:

$$\text{Vehicle width } (w\mathbf{1})=(h\mathbf{1}-h\mathbf{2})\times\text{tangent}(r/2)\times 2 \text{ equation} \quad (1).$$

The width of the vehicle calculated by equation (1) is based on the assumption that an upper width and a lower width of the vehicle are the same with each other.

Accordingly, the vehicle measuring apparatus using the laser distance sensor has the following advantages.

That is, the height and the width of a travelling vehicle can be measured without a slow-moving or stoppage of the vehicle, it is not necessary to widen the road in order to prepare an installation space of an auxiliary unit or a device itself for measuring the vehicle such as the traffic island on the road, a detection line, a pattern or an intermittent marking region are not required on the road, and influence on the measurement of vehicle can be minimized even in a bad weather when it rains or snows.

Nevertheless, the vehicle measuring apparatus using the laser beam has the following problems.

That is, if it is adopted for a large-scale bus, as shown in FIG. 6B, since the width of the upper portion and the width of the lower portion of the vehicle are constant, the width of the vehicle according to the calculation of equation (1) can be determined to the actual width. Meanwhile, however, if equation (1) is adopted to a car to measure the width of the car, as shown in FIG. 6A, since, in general, the width of vehicle is mostly determined at the top point or at the middle point, there is much difference between the width of the top point and the width of the bottom point. Especially, in line with the development of the automobile technology, shapes of cars are in the tendency of diversification. Therefore, conversion of the width of vehicle to length by using information of angle and height may cause much error.

In addition, in case of adopting the conventional vehicle measuring apparatus using laser beam to a multi-lane ETCS, if a vehicle is normally travelling in one roadway, a desired measurement value can be obtained. But if the vehicle travels over two roadways rather than travels in one roadway, the upper middle or lower corner of the vehicle, not the upper both corners of the vehicle, is measured as a width of the vehicle. Then, the measured width of the vehicle would have much difference with an actual width of the vehicle.

SUMMARY OF THE INVENTION

Therefore, an object of the present invention is to provide vehicle measuring apparatus and method that are capable of accurately detecting a vehicle by using a laser sensor.

Another object of the present invention is to provide vehicle measuring apparatus and method that are capable of accurately measuring height and width of a vehicle travelling at a high speed.

Still another object of the present invention is to provide vehicle measuring apparatus and method that are capable of accurately measuring height and width of a vehicle while allowing vehicles travelling in every roadway desired to be detected to freely change lanes.

Yet another object of the present invention is to provide a vehicle measuring apparatus and method that are capable of accurately measuring width of a vehicle traveling by the unit of length, not by the unit of angle.

Another object of the present invention is to provide a vehicle measuring apparatus and method that are capable of accurately measuring width of a traveling vehicle regardless of a shape of the vehicle.

The objects of the present invention can be accomplished by providing a vehicle measuring apparatus according to the invention comprising: a plurality of laser sensors separated with a predetermined height from a road surface and installed closely to each other corresponding to width of every road way, and for providing a signal to measure the vehicle; and a processor means electrically connected to the laser sensors and for computing height and width of the vehicle on the basis of the signal received from the laser sensors and previously stored installation information of the plurality of laser sensors.

To achieve the above objects, there is also provided a vehicle measuring method comprising the steps of: sequentially driving a plurality of laser sensors separated from the road surface with a predetermined height and installed closely to each other corresponding to width of every roadway on the road; measuring a lapse time from a time point of emitting a laser light emitted from the plurality of laser sensors according to driving of the plurality of laser sensors to a time point of receiving light; calculating a distance corresponding to the measured lapse time; and computing height and width of a vehicle on the base of the calculated distance value.

To achieve the above objects, there is also provided a vehicle measuring method comprising the steps of: grouping a plurality of laser sensors separated from the road surface with a predetermined height and installed closely to each other corresponding to width of every roadway on the road into a plurality of groups corresponding to each roadway; sequentially driving the plurality of laser sensors in a group one by one and simultaneously driving the plurality of laser sensor groups; measuring a lapse time from a time point of emitting a laser light emitted from the plurality of laser sensors according to driving of the plurality of laser sensors to a time point of receiving light; calculating a distance corresponding to the measured lapse time; and computing height and width of a vehicle on the base of the calculated distance value.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

Vehicle measuring apparatus and method in accordance with preferred embodiments of the present invention will now be described with reference to FIGS. 8 through 20B.

Figure 8:
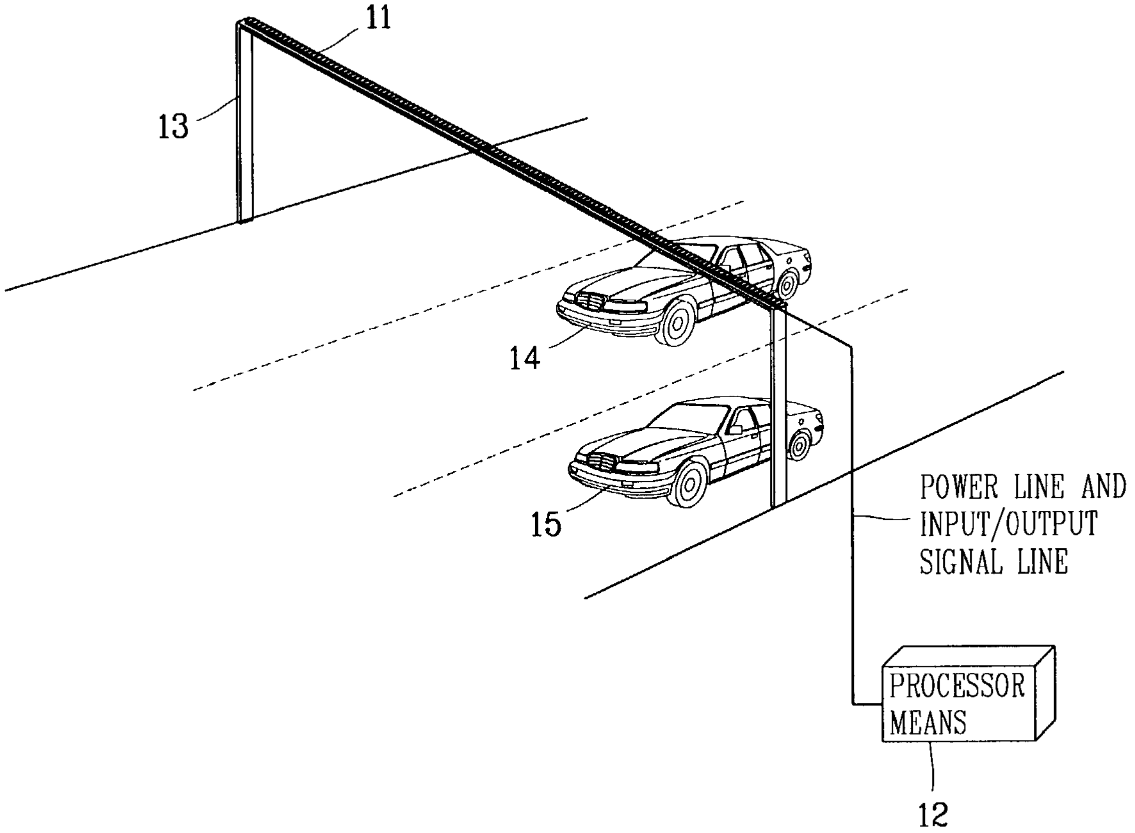
FIG. 8 is a schematic view showing an installation state of a vehicle measuring apparatus in accordance with a first embodiment of the present invention.

FIG. 8 is a schematic view showing an installation state of a vehicle measuring apparatus in accordance with a first embodiment of the present invention.

As shown in FIG. 8, the vehicle measuring apparatus includes a plurality of laser sensors 11 installed to be close to each other corresponding to the width of the whole roadway on a gantry 13 separated from the road surface with a predetermined height, and a processor means 12 electrically connected to the plurality of laser sensors 11 to operate the plurality of laser sensors 11 and calculating height and width of a vehicle travelling at a high speed on the basis of a signal for vehicle measurement outputted from the laser sensor 11 and previously stored installation information of the plurality of laser sensors.

Reference numerals 14 and 15 designate vehicles running on the multi-lane road.

The gantry 13 is a means for supporting and separating the plurality of laser sensors from the ground of the road with a predetermined height. That is, the gantry 13 is constructed roughly in a football goal gate shape by using two vertical columns standing upwardly from the width directional edges of the road and one horizontal column connecting the two vertical columns.

The width of the gantry 13 is determined by the width of the road and its height is preferably 4.5 m~7 m in consideration of special vehicles which load various freight.

The processor means 12 is electrically connected to the laser sensor 11 through a power supply line and input/output signal line.

The construction of the laser sensor will now be described with reference to FIG. 9.

Figure 9:
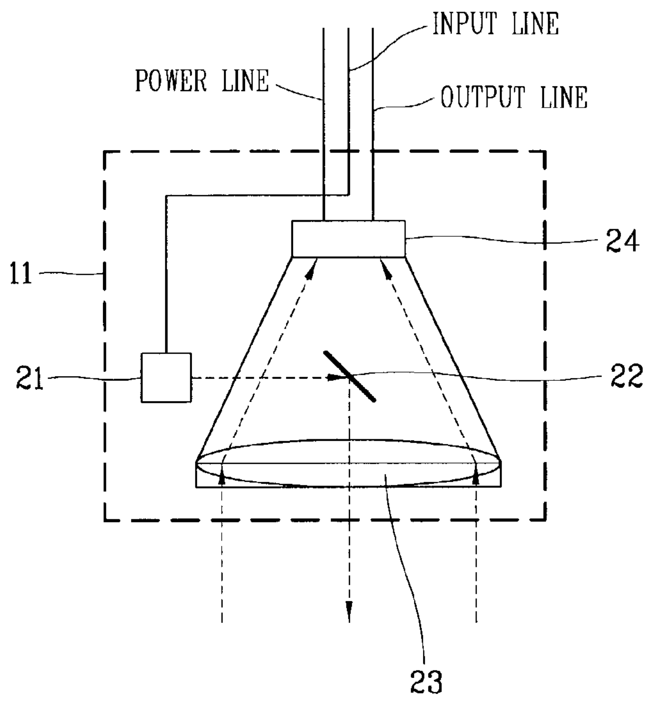
FIG. 9 is a view showing a detailed construction of a laser sensor in accordance with the present invention.

FIG. 9 is a view showing a detailed construction of a laser sensor in accordance with the present invention;

As shown in FIG. 9, the laser sensor 11 includes a laser emitter 21 for emitting each laser light; a reflection plate 22 for reflecting the laser light emitted from the laser emitter 21 to the road; a laser receiver 24 for receiving a laser light reflected from the road surface or an object on the road and for providing a signal to the processor means 12; and a lens 23 for collecting the laser light reflected from the road surface or the object on the road and for providing it to the laser receiver 24.

That is, the laser receiver 24 of the laser sensor 11 is installed at the uppermost position inside the laser sensor 11, the laser emitter 21 is installed at the lower position of the side of the laser receiver 24, the reflection plate 22 for reflecting the laser light emitted from the laser emitter 21 onto the road surface is installed at a lower portion of the laser receiver 24, and the lens 23 for collecting the reflection light which is reflected by being somewhat scattered from the road surface to the laser receiver 24 is installed at a lower portion of the reflection plate 22.

The reflection plate 22 may be removed by disposing the laser emitter 21 and the laser receiver 24 horizontally in a line. But in such a case, a light receiving probability of the laser receiver 24 is degraded in receiving the reflection light returning by being reflected from the road surface or the object on the road. Therefore, the reflection plate 22 is preferably installed.

The laser emitter 21 emits upon receiving a pulse signal (a drive signal) of a predetermined voltage outputted from the processor means 12. As the laser emitter 21, a laser diode emitted by a drive signal of the above mentioned voltage can be preferably used. The predetermined voltage is preferably about a DC 5 volt.

An input line is an input signal line from the processor means 12 for driving the laser emitter 21, an output line is a signal line through which an output signal from the laser receiver 24 is outputted to the processor means 12, and a power line is preferably a power supply line from a DC constant voltage supply unit (not shown) installed in a single common cabinet together with the processor means 12. The DC constant voltage supply unit converts a commercial AC power into a DC voltage and supplies the DC voltage.

Figure 10:
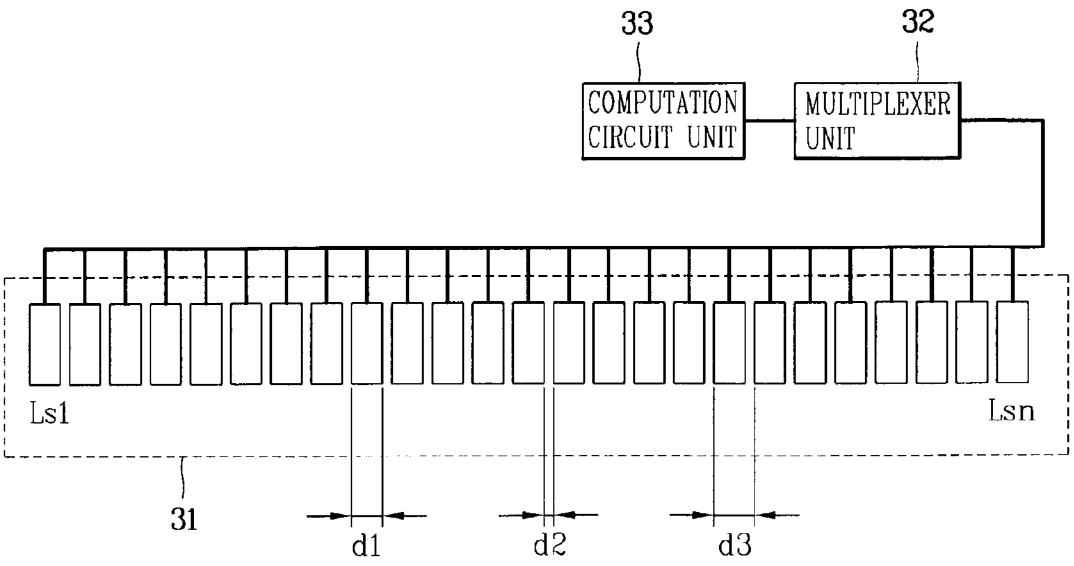
FIG. 10 is a block diagram showing a major part of the vehicle measuring apparatus in accordance with the first embodiment of the present invention.

FIG. 10 is a block diagram showing a major part of the vehicle measuring apparatus in accordance with the first embodiment of the present invention.

The processor means 12 as described above with reference to FIG. 8 includes a multiplexer 32 for generating a drive signal (pulse signal) to drive the laser sensors (LS1–LSn) and selectively transmitting the drive signal to the laser sensors (LS1–LSN), and selectively receiving a signal for measuring the vehicle from the plurality of laser sensors (LS1–LSn); and a computation circuit 33 for computing height and width of the vehicle on the basis of an output signal from the multiplexer 32 and installation information of the laser sensors LS1–LSn.

The multiplexer 32 and the computation circuit 33 are connected to the plurality of laser sensors LS1–LSn through the input and output signal lines A laser sensor unit 31 is constructed with an array of a plurality of laser sensors (LS1–LSn) each having an individual construction as shown in FIG. 9. Characteristically, the laser sensors are densely installed corresponding to the overall width of the whole roadways (three roadways in FIG. 8) of the road in order to accurately measure height and width of vehicles travelling in the entire roadways of the road in the same traveling direction by the unit of length.

The installation information of the laser sensors LS1–LSn is a distance d3 between laser sensors LS1–LSn. The distance d3 is a sum of an installation interval between laser sensors LS1–LSn d2 and a width direction length of the roadway d1 of the laser sensors LS1–LSn. That is, d3=d2+d1 . The installation information is a value previously stored in the computation circuit unit 33 at the time of manufacturing the apparatus of the invention or when the apparatus of the invention is installed at the road. In this respect, the closer to '0' the installation interval d2 between laser sensors LS1–LSn is, the better. The width direction length d1 of the roadway of the laser sensors LS1–LSn may differ depending on products, and currently a product of at least about 4 cm (centimeters) can be purchased in the market. Therefore, if the installation interval d2 is '0', that is, if the laser sensors LS1–LSn are installed with no interval therebetween, the installation information of the laser sensors LS1–LSn previously stored in the computation circuit unit 33 is information representing only the width direction length d1 of the roadway of the laser sensors LS1–LSn.

Figure 11:
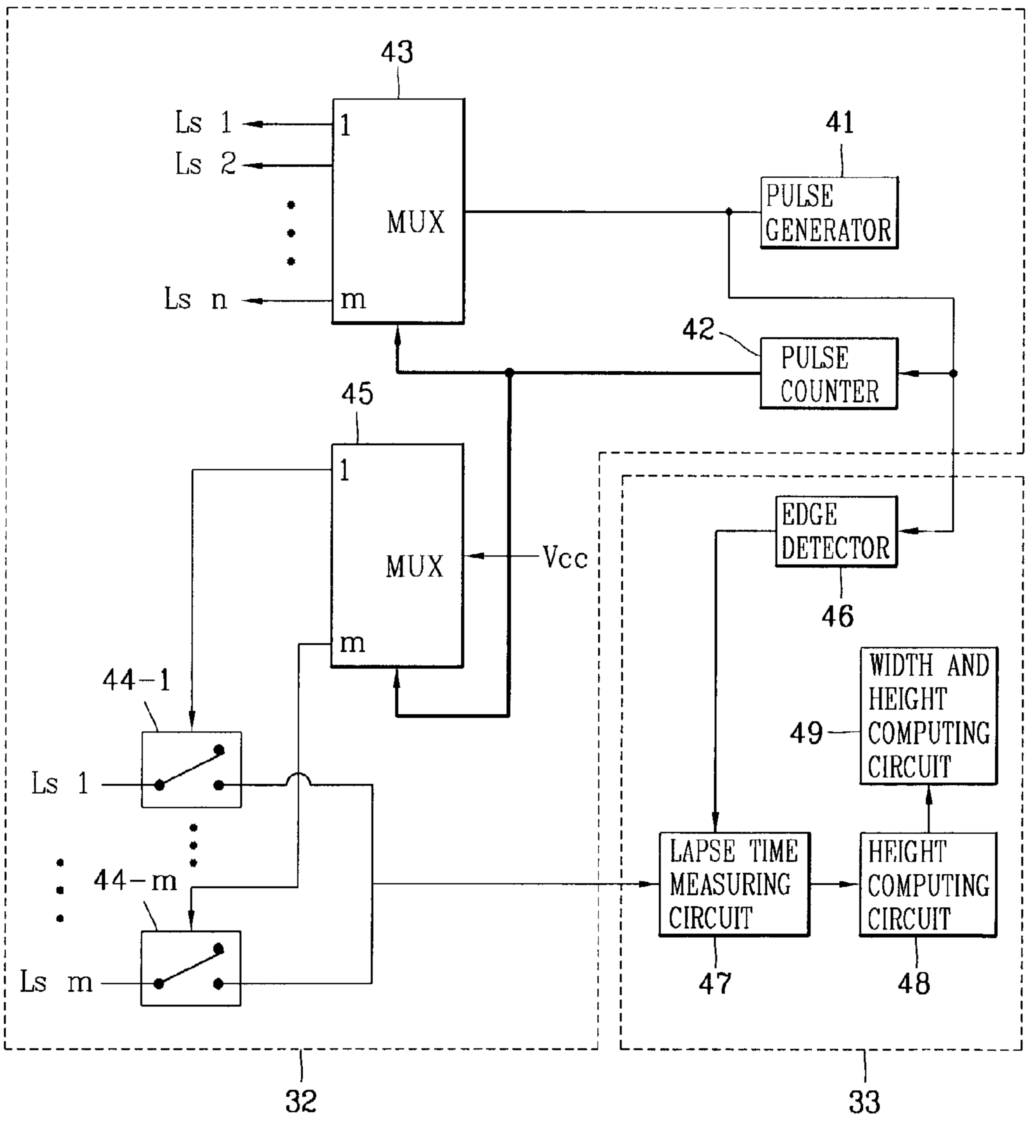
FIG. 11 is a block diagram showing the construction of a multiplexer and a computation circuit of FIG. 10.

FIG. 11 is a block diagram showing the construction of the multiplexer unit and the computation circuit unit of FIG. 10.

As shown in FIG. 11, the multiplexer unit 32 includes a pulse generator 41 for generating a pulse signal to drive the laser sensors LS1–LSn; a pulse counter 42 for counting the pulse signal generated from the pulse generator 41 and for generating a pulse count signal corresponding to the counted pulse signal; a first multiplexer 43 for sequentially outputting the pulse signal generated from the pulse generator 41 according to the pulse count signal of the pulse counter 42 to the laser sensors LS1–LSn; a plurality of switches 44-1~44-*m* provided corresponding to the laser sensors LS1–LSn and being switched to a position for providing a signal to measure a vehicle outputted from the laser sensors LS1–LSn or to a position for interrupting providing of the signal to measure the vehicle outputted from the laser sensors LS1–LSn; and a second multiplexer 45 for selectively operating switches 44-1~44-*m* corresponding to the laser sensors LS1–LSn to which the first multiplexer 43 has outputted the pulse signal among the plurality of switches 44-1~44-*m*.

The pulse counter 42 counts the number of pulses of the pulse signal generated from the pulse generator 41 until when it reaches a pre-set count limitation value so as to correspond to the installation number of the laser sensors LS1–LSn, and when the number of the counted pulses reaches the count limitation value, the pulse counter 42 is automatically reset. In this context, the limitation value is the total number of laser sensors LS1–LSn. That is, the pulse counter 42 drive the laser sensors LS1–LSn one by one, and when one period of the vehicle measurement is completed, the pulse counter 42 is reset.

In order to correspond the count value of the pulse counter 42 to the number of laser sensors LS1–LSn, the processor means 12 may additionally include a circuit (not shown) for comparing the count value and the pre-set limitation value and outputting a reset signal to the pulse counter 42 if the count value and the pre-set limitation value are identical to each other.

The switches 44-1~44-*m* can be constructed as a transistor which is turned on when a constant voltage (Vcc) is applied thereto.

As shown in FIG. 11, the computation circuit 33 includes an edge detector 46 for detecting an edge of a pulse signal generated from the pulse generator 41 and outputting an instructing signal to initiate and instruct lapse time measurement from a time point of light emitting of the laser sensors LS1–LSn to a time point of light receiving; a lapse time measuring circuit 47 for measuring a lapse time from the time point of light emitting of the laser sensors LS1–LSn to the time point of light receiving in response to the instruction signal outputted from the edge detector 41 and the output signal from the switches 44-1~44-*m* ; a height computing circuit 48 for computing height of a vehicle on the road on the basis of a lapse time measured from the lapse time measuring circuit 47 and a measured distance from the laser sensors LS1–LSn to the road surface and to the vehicle on the road which have been previously stored corresponding to every lapse time; and a width computing circuit 49 for computing width of a vehicle by computing the number of laser sensors LS1–LSn corresponding to the vehicle height information in the height computing circuit 48, and calculating a vehicle width by comparing the computed vehicle width information and the previously stored vehicle width information.

The operation and effect of the vehicle measuring apparatus in accordance with the first embodiment of the present invention will now be described in detail.

First, the pulse generator 41 generates a DC pulse signal with a high potential value of a DC 5V and a low potential value of 0V and outputs the generated DC pulse signal to the pulse counter 42, the multiplexer 43 and the edge detector 46.

The pulse counter 42 counts the number of pulses of the pulse signal outputted from the pulse generator 41 until when the number of pulses reaches the pre-set count limitation value identical to the total number of laser sensors LS1–LSn. If the pulse count value of the pulse counter 41 is '1', the multiplexer 43 receiving the count value '1' outputs a pulse signal to the first laser sensor LS1 so that a laser light can be generated from the first laser sensor LS1. At the same time, upon receiving the count value '1', the multiplexer 45 outputs a voltage (Vcc) to the first switch 44-1 corresponding to the first laser sensor LS1 to turn it on, whereby the multiplexer 45 transmits a light receiving signal for the reflection light of the laser light to the lapse time measuring circuit 47 installed in the computation circuit 33 and to thereby terminate the lapse time measuring for the first laser light.

If the pulse count value 'n', the multiplexer 43 outputs a pulse signal to the nth laser sensor LSn so that a laser light can be generated from the nth laser sensor LSn. At the same time, upon receiving the count value 'n', the multiplexer 45 turns on the nth switch 44-*n* to transmit a light receiving signal received from the laser sensor LSn to the lapse time measuring circuit 47 installed in the computation circuit unit 33, to thereby terminate the lapse time measuring for the nth laser light.

The laser emitter 21 provided in each of the laser sensors LS1–LSn emits laser light while the pulse signal generated from the pulse generator 34 has a high potential.

The edge detector 46 detects a rising edge of the pulse signal outputted from the pulse generator 41, it outputs an instruction signal for initiating measurement of time (lapse time) taken from the point when the laser light is emitted form the laser sensor to the point when the emitted laser beam is received after being reflected from the road surface or the surface of the vehicle, to the lapse time measuring circuit 47.

Figure 12:
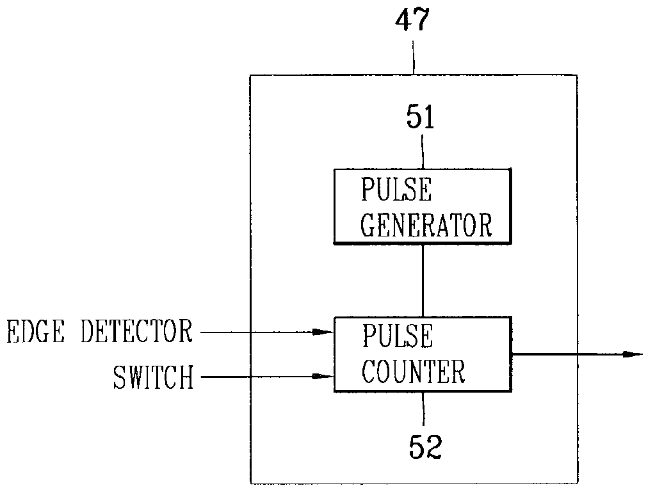
FIG. 12 is a block diagram showing a lapse time measuring circuit of FIG. 11 in accordance one embodiment of the present invention.

FIG. 12 is a block diagram showing the lapse time measuring circuit of FIG. 11 in accordance one embodiment of the present invention As shown in FIG. 12, the lapse time measuring circuit 47 includes a pulse generator 51 and a pulse counter 52 for counting pulses generated from the pulse generator 51 in response to the instruction signal outputted from the edge detector 46 and terminating the pulse counting operation in the pulse generator 51 in response to an output signal from the currently selected switch among the switches 44-1~44-*m*.

Figure 13:
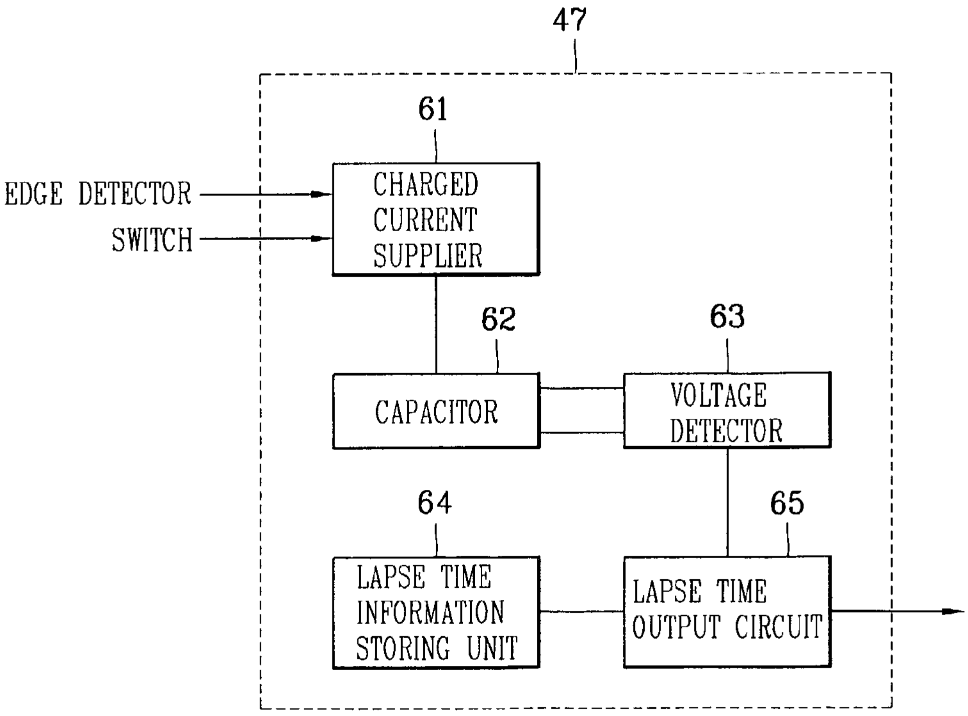
FIG. 13 is a block diagram showing a lapse time measuring circuit of FIG. 11 in accordance another embodiment of the present invention.

FIG. 13 is a block diagram showing a lapse time measuring circuit of FIG. 11 in accordance another embodiment of the present invention.

As shown in FIG. 13, the lapse time measuring circuit 47 includes: a capacitor 62; a charge current supplier 61 for charging the capacitor 62 in response to the instruction signal outputted from the edge detector 46 and for stopping the charging of the capacitor 62 in response to the output signal from the currently selected switch among the switches 44-1~44-*m*; a voltage detector 63 for measuring a voltage charged in the capacitor 62; a lapse time information storing circuit 64 for storing a lapse time data corresponding to the voltage charged in the capacitor 62 in advance; and a lapse time output circuit 65 for reading the lapse time data from the lapse time information storing circuit 64 and outputting the read lapse time data to the height computing circuit 48.

The lapse time measuring circuit 47 with a different construction uses characteristics of the capacitor with a charge voltage that can be varied according to time. That is, the lapse time measuring circuit 47 stores in advance the lapse time data in the lapse time storing circuit 64 constructed as a memory (not shown) according to the charge voltage of the capacitor 62. When the voltage detector 73 constructed as a potential transformer, a current transformer or a voltage transformer (generally constructed as an operation amplifier) detects a charged voltage of the capacitor 62, the lapse time measuring circuit 47 reads a lapse time corresponding to the charged voltage detected from the lapse time output circuit 65 including as a CPU (Central Processing Unit not shown) from the lapse time storing circuit 64 and outputs the read lapse time data to the height computing circuit 48.

The construction of the height computing circuit 48 will now be described in detail with reference to FIG. 14.

Figure 1:
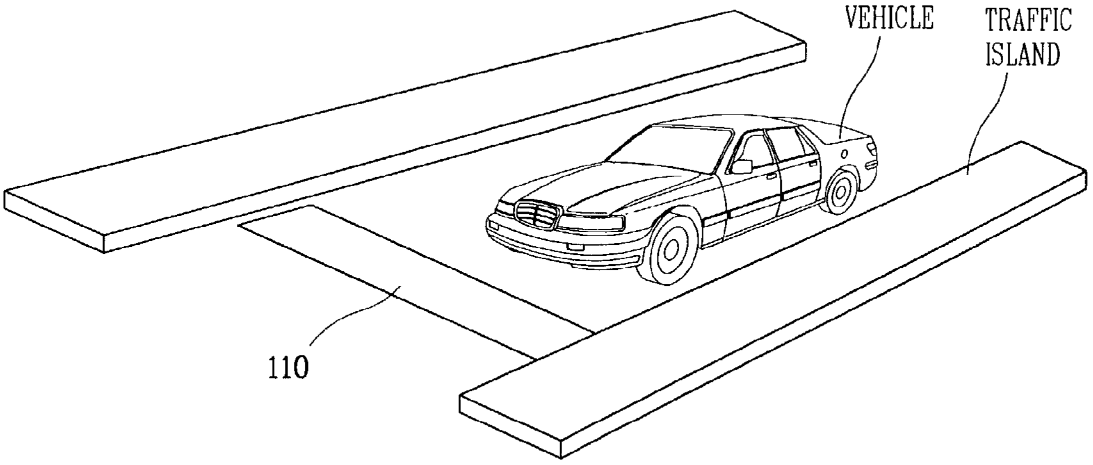
FIG. 1 CONVENTIONAL ART
FIG. 1 is a schematic view showing a vehicle measuring apparatus using a tread-board sensor in accordance with a conventional art.
Figure 2A:
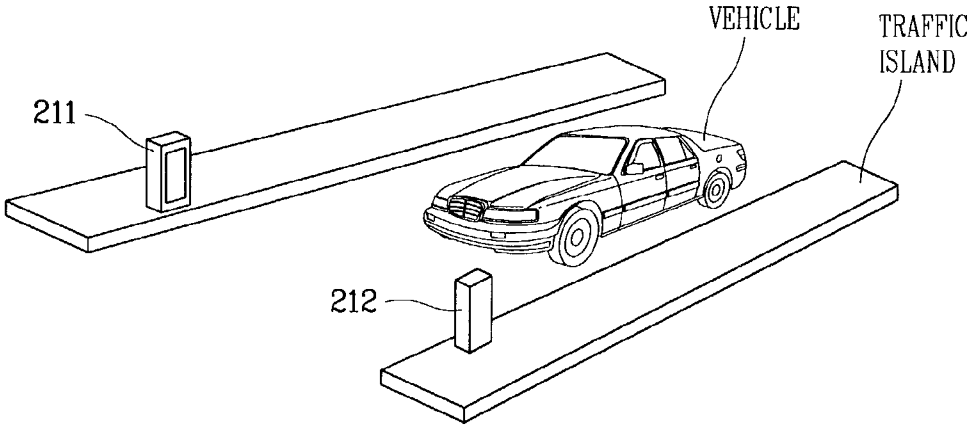
FIG. 2A CONVENTIONAL ART
FIG. 2A is a schematic view showing one non-contact type vehicle measuring apparatus using a photo sensor in accordance with the conventional art.
Figure 2B:
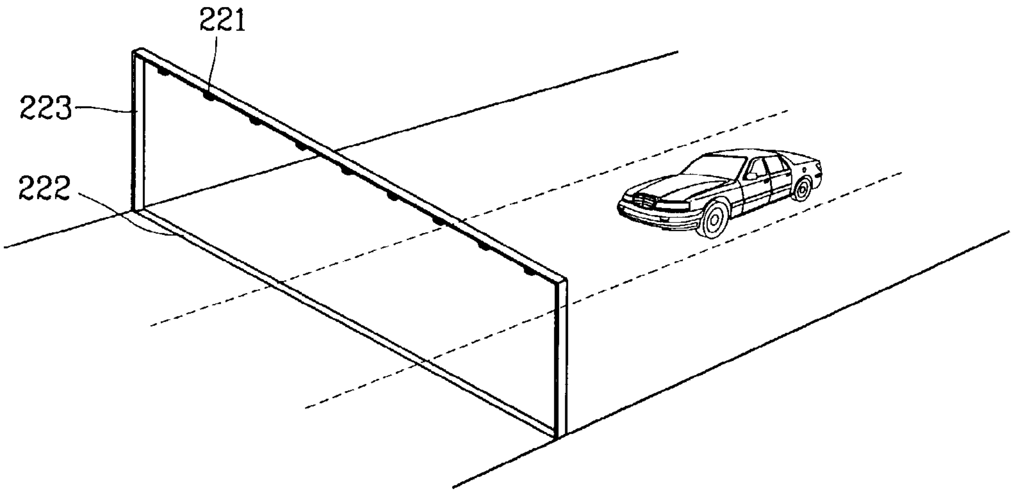
FIG. 2B CONVENTIONAL ART
FIG. 2B is a schematic view showing another non-contact type vehicle measuring apparatus using a photo sensor in accordance with the conventional art.
Figure 3:
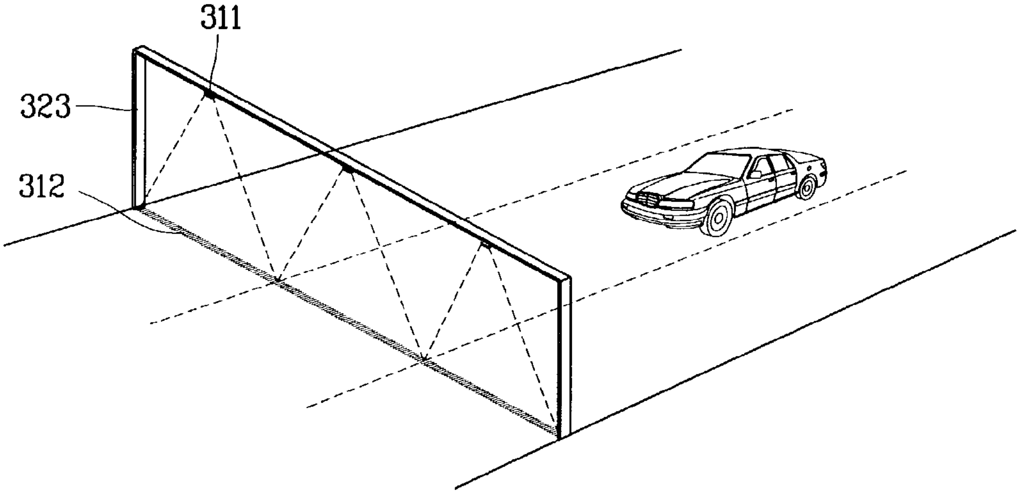
FIG. 3 CONVENTIONAL ART
FIG. 3 is a schematic view showing a vehicle measuring apparatus using a CCD (Charge Coupled Device) in accordance with the conventional art.
Figure 4:
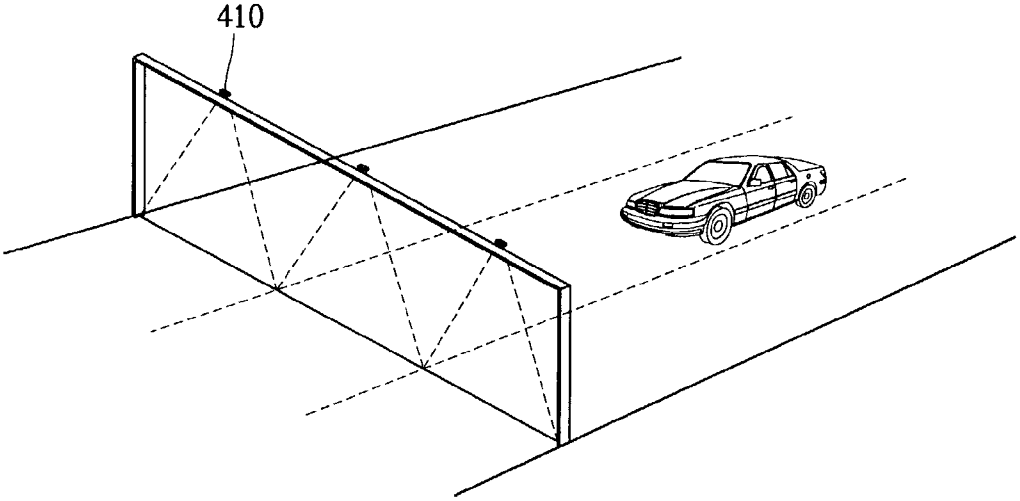
FIG. 4 CONVENTIONAL ART
FIG. 4 is a schematic view showing a vehicle measuring apparatus using a laser distance sensor in accordance with the conventional art.
Figure 5:
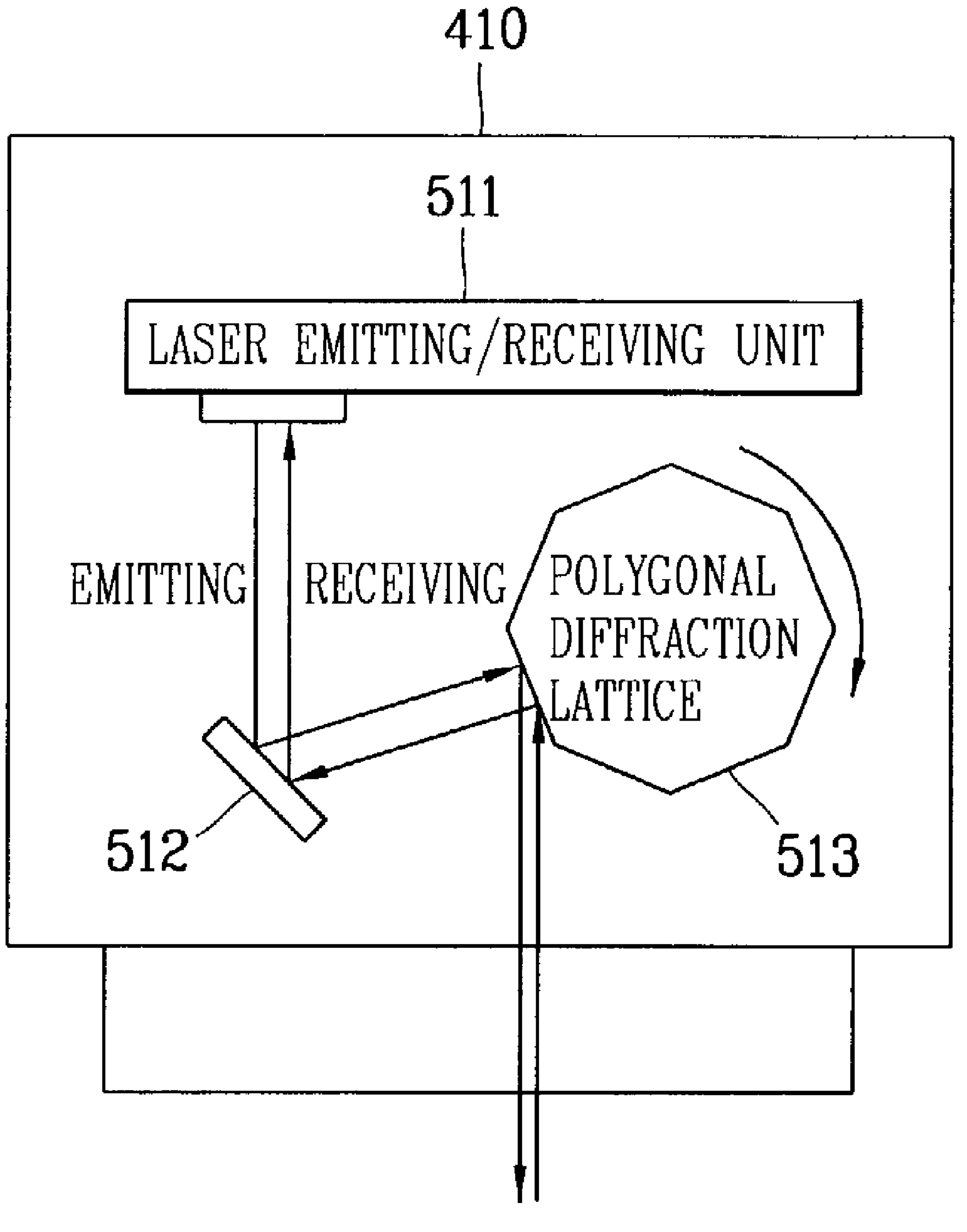
FIG. 5 CONVENTIONAL ART
FIG. 5 is a schematic view showing the construction of the laser distance sensor of FIG. 4.
Figure 6A:
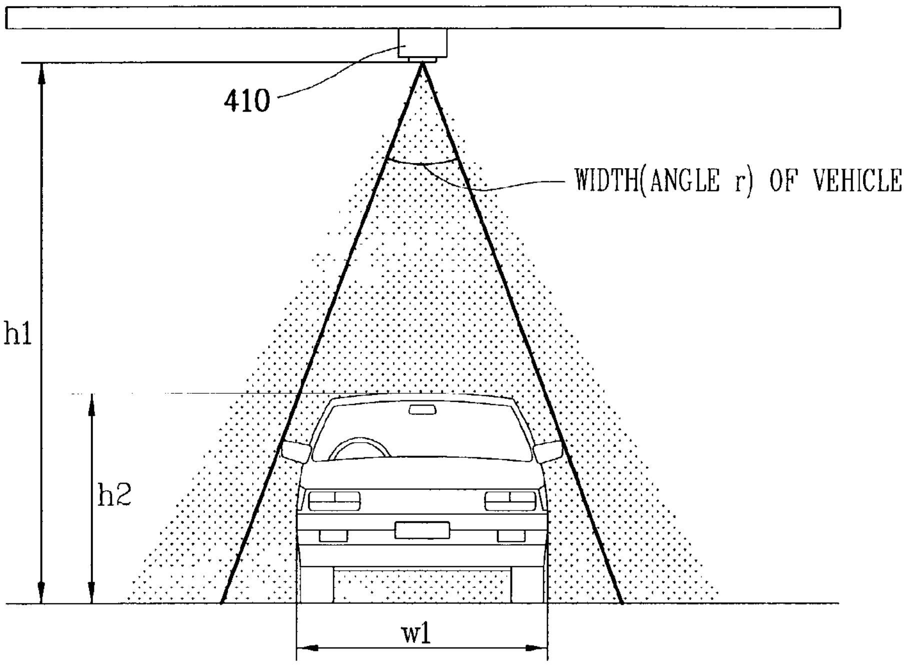
FIG. 6A CONVENTIONAL ART
FIGS. 6A and 6B show a vehicle measurement region using the laser distance sensor of FIG. 5.
Figure 6B:
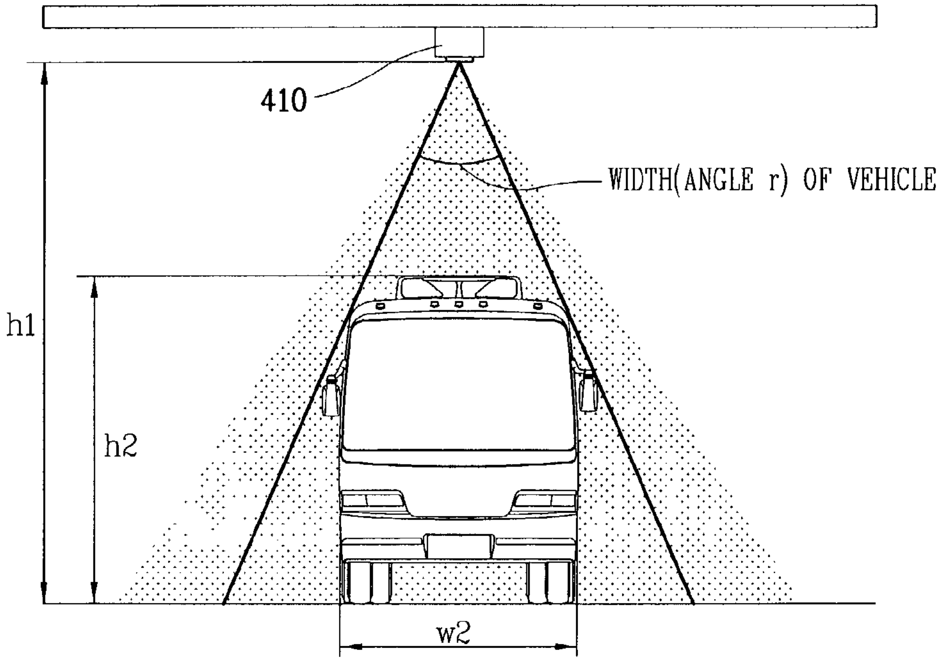
FIG. 6B CONVENTIONAL ART
Figure 7A:
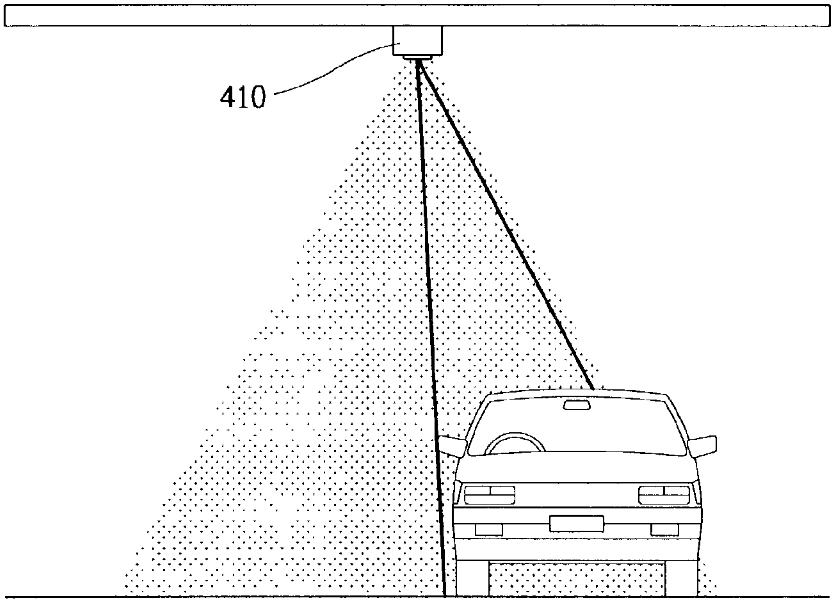
FIG. 7A CONVENTIONAL ART
FIGS. 7A and 7B show problems caused when a vehicle is measured by using the laser distance sensor of FIG. 5.
Figure 7B:
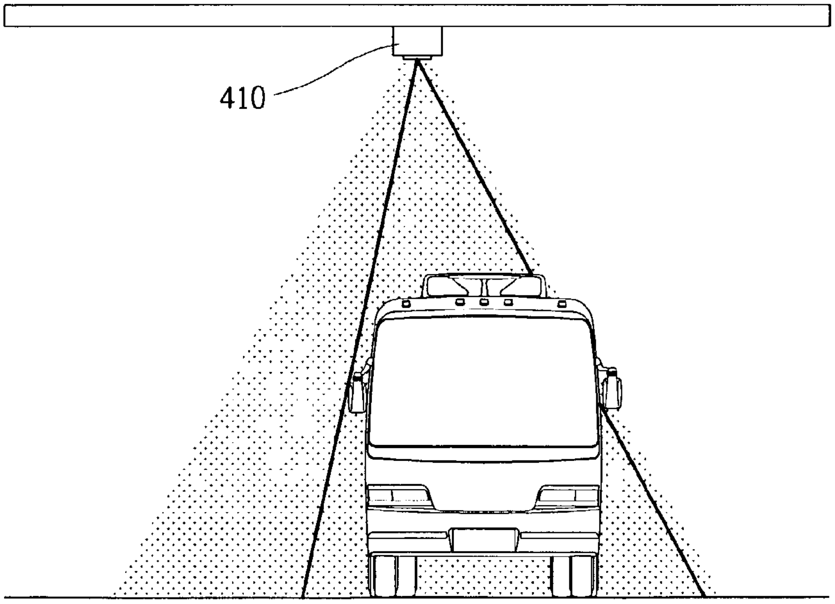
FIG. 7B CONVENTIONAL ART
Figure 14:
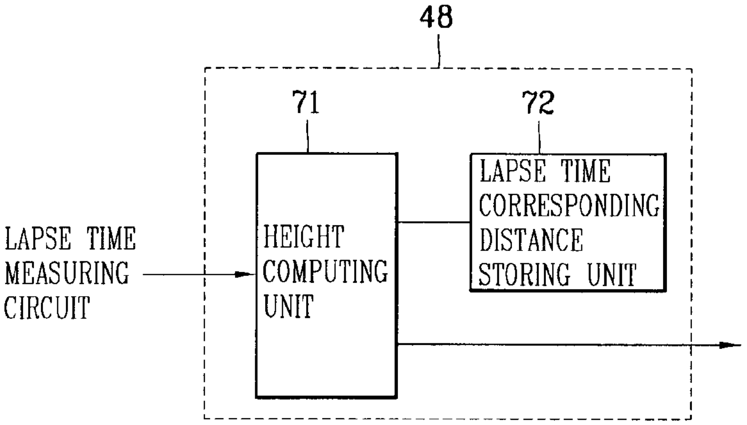
FIG. 14 is a block diagram showing a height computing circuit of FIG. 1 in accordance with one embodiment of the present invention.

FIG. 14 is a block diagram showing a height computing circuit of FIG. 1 in accordance with one embodiment of the present invention.

The height computing circuit 48 is to compute the height of an object on the road on the basis of the lapse time measured by the lapse time measuring circuit 47.

As shown in FIG. 14, the height computing circuit 48 comprises a distance corresponding lapse time storing unit 72 for previously storing distance information corresponding to each lapse time; and a height computing unit 71 for reading a distance corresponding to the lapse time outputted from the distance corresponding lapse time storing unit 72 and for computing height of an object on the road. That is, the height computing unit 71 determines the distance information measured when there is no object on the road as a distance from the laser sensors 44-1~44-*n* to the road surface, reads the distance information corresponding to the lapse time calculated by the lapse time measuring circuit 47, that is, the distance from the laser sensors 44-1~44-*n* to the object from the distance corresponding lapse time storing unit 72, and obtains a difference between the read distance value and the distance value from the laser sensor 44-1~44-*n* to the road surface, thereby calculating the height of the object on the road.

Figure 15:
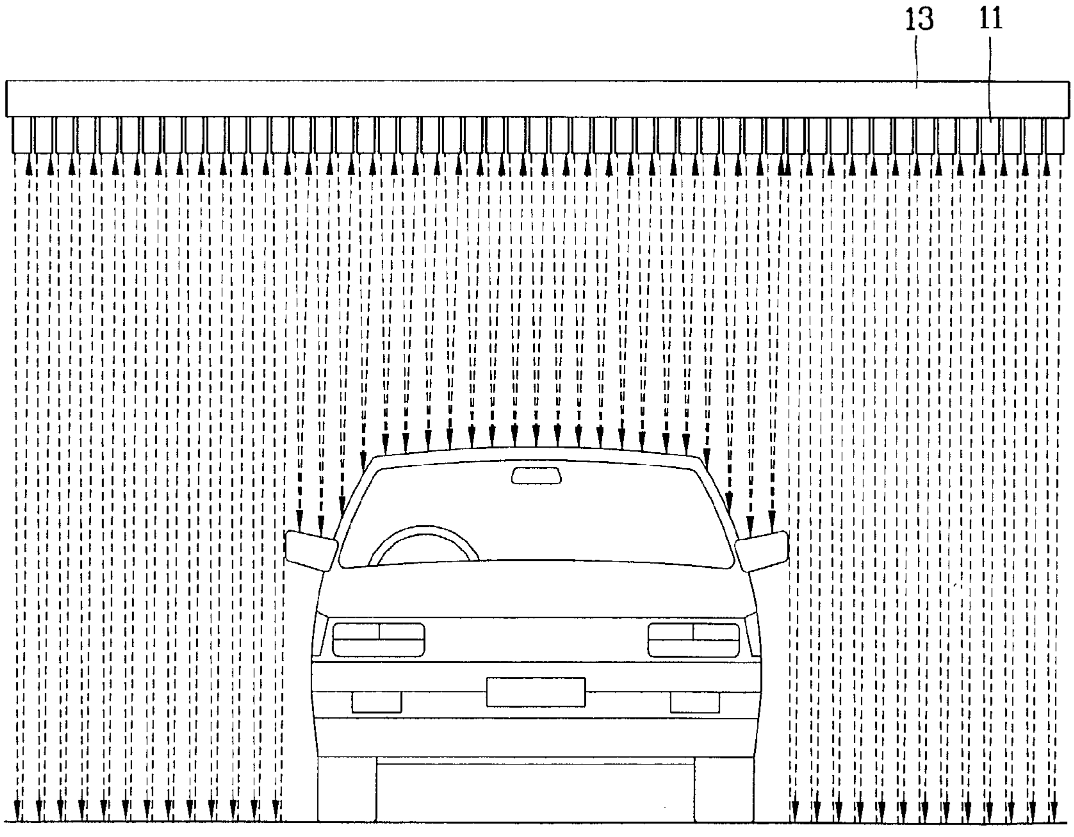
FIG. 15 is a front view showing an operation state of a plurality of laser sensor array in accordance with the present invention.

FIG. 15 is a view showing an operation state of a plurality of laser sensor array in accordance with the present invention.

As shown in FIG. 15, the lapse time taken for the laser light emitted from the laser sensors LS1–LSn to the road surface to be received by the laser sensors LS1–LSn is longer than the lapse time taken for the laser light emitted form the laser sensors LS1–LSn to the vehicle to be received by the laser sensors LS1–LSn.

Thus, since the distance corresponding to the lapse time that the laser light emitted from the laser sensor to the road surface is received by the laser sensor is maximized, height values of every reflection point of a vehicle can be calculated by subtracting the distance from the reflection point of a vehicle passing the directly-below side of the laser sensor 11 on the gantry 13 to the laser sensor, from the maximum distance value. In this respect, it is preferred that a maximum value of the height values of reflection points is determined as the height of the vehicle.

The thusly calculated height information is outputted to the width computing circuit 49

Figure 16:
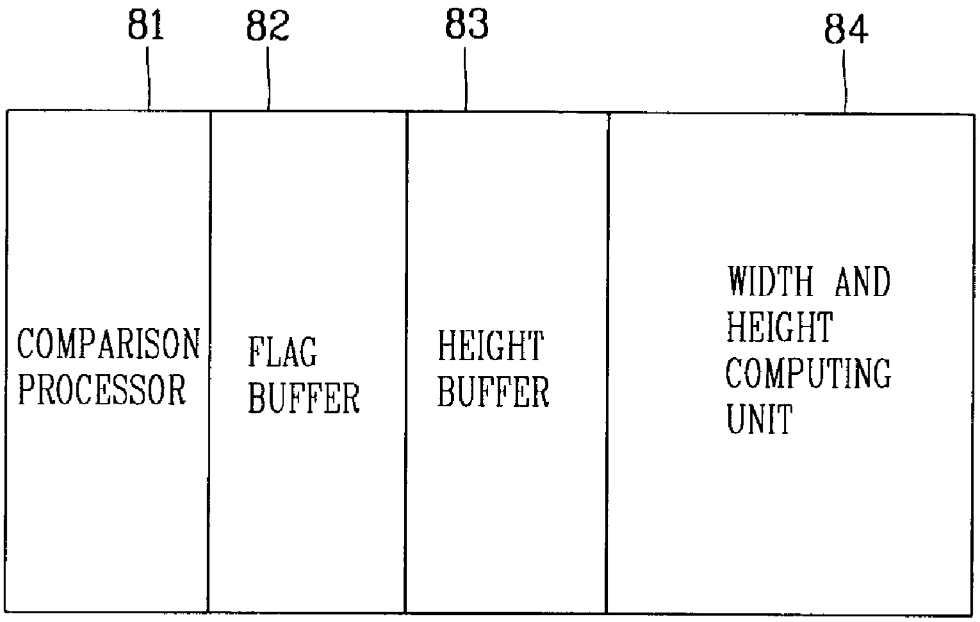
FIG. 16 is a block diagram showing a width computing circuit of FIG. 11 in accordance with one embodiment of the present invention.

FIG. 16 is a block diagram showing the width computing circuit of FIG. 11 in accordance with one embodiment of the present invention.

As shown in FIG. 16, the width computing circuit 49 comprises a flag buffer 82 for storing a flag value corresponding to the height value calculated from the height computing circuit 48; a comparison processor 81 for comparing the height values of the object on the road as calculated in the height computing circuit 48, and for setting a corresponding address of the flag buffer 82 as '1' if the object height values are greater than the reference height value and for resetting a corresponding address of the flag buffer 82 as '0' if the object height values are smaller than the reference height value; a height buffer 83 for storing height of the object on the road, which is higher than the reference height value as determined by the comparison processor 81; and a width and height computing unit 84 for computing a width of the vehicle on the basis of the height value stored in the height buffer 83, the roadway width direction length information (d1) of the laser sensors 44-1~44-*n* and the set value of the flag buffer 82.

After the height measurement of one period is completed, that is, the flag buffer 82 is reset/set as '0' or '1' and the height value is stored in the height buffer 83 after all of the laser sensors 44-1~44-*n* have been subjected to the height measurement one by one, the width and height computing unit 84 searches the flag buffer 82 to count the number of flags which have been successively set as '1', and calculates a width of the object on the road by multiplying the number of the counted flags by the previously stored roadway width direction length (d1) of the laser sensor. And then, the width computing unit 84 compares the calculated object width with the previously stored minimum width available to determine as a corresponding vehicle. If the calculated object width is greater than or the same with the minimum width, the width computing unit 82 determines that the object is a corresponding vehicle and outputs the calculated width information of the vehicle on the road. This process is expressed by equations (2) through (7):

$$W1=d1\times N \tag{2}$$

wherein W1 is a width of the object on the road, d1 is a roadway width direction length of the laser sensor, and 'N' is the number of flags which have been successively set as '1'. At this time, 'N' is the number of consecutive laser sensors corresponding to the height value higher than a minimum height with which something can be regarded as a vehicle.

$$\text{If } W1\geq W\text{min},\ W1=W \tag{3}$$

wherein W1 is a width of an object on the road, Wmin is a previously stored minimum width which can be determined as a vehicle, and 'W' is a width of the vehicle.

Meanwhile, if the laser sensors LS1–LSn are not closely installed to each other, that is, if the interval d2 between the laser sensors LS1–LSn is not '0' but has some interval, a result value (d2×(N−1)) obtained by multiplying the previously stored interval d2 between the laser sensors by the number less as many as '1' than the number of flags successively set as '1' (that is, N−1) and a result value (d1×N) obtained by multiplying the previously stored roadway width direction length (d1) of the laser sensor by the number of flags successively set as '1' (that is, d1×N) are added to compute the width of the vehicle on the road.

Thereafter, the computed width of the vehicle on the road is compared with the previously stored minimum width to determine a corresponding vehicle. If the former is greater than or the same as the latter, it is determined as a corresponding vehicle. This can be expressed by the following equation (4):

$$W1=\{d2\times(N-1)\}+(d1\times N) \quad (4)$$

wherein W1 is the width of the object on the road, d2 is the interval between laser sensors, 'N' is the number of flags consecutively set as '1', that is, 'N' is the number of consecutive laser sensors corresponding to a height value not less than the minimum height which can be regarded as a vehicle, and d1 is the roadway width direction length of the laser sensor.

$$\text{If, } W1 \geqq W\text{min},\ W1=W \quad \text{equation (5)}$$

wherein W1 is the width of the object on the road, Wmin is a previously stored minimum width of the vehicle to determine as a corresponding vehicle, and 'W' is the width of the vehicle.

If a maximum height value (Hmax) of the height values stored in the height buffer 83 is not less than the minimum height value (Hmin) which can be regarded as a vehicle, the height and width computing unit 84 determines the maximum height value (Hmax) as the height (H) of a vehicle, which can be expressed by the following equation (6):

$$H\text{max}=\text{Max}\ (H1, H2, \ldots, Hn) \quad (6)$$

wherein Hmax is the maximum height value of the vehicle on the road, and H1, H2, . . . , Hn are data (height values) stored in the height buffer 83.

$$\text{If } H\text{max} \geqq H\text{min},\ H\text{max}=H \quad (7)$$

Wherein Hmax is the maximum height value of the vehicle on the road, Hmin is a minimum height with which something can be regarded as a corresponding vehicle, and 'H' is the height of the vehicle.

Meanwhile, a position of a vehicle can be determined by multiplying the distance d3 between the laser sensors and a position value (n) of the first flag buffer determined as a vehicle. This will now be described in detail.

First, the distance from a reference border line on the road, for example, the central separating line for separating upstream roadways from downstream roadways, to one corner of a vehicle can be computed by multiplying the distance d3 between the laser sensors and the position value (n) of the first buffer of the flag buffer 82 determined as a vehicle.

In addition, if each roadway distance, that is, a distance range of each roadway from the central separating line, is previously stored, what range a distance from a reference border line on the road, for example, a central line, to one corner of the vehicle belongs to is determined to recognize the position of the vehicle.

The width, height and position information of the vehicle computed through the above process is outputted to a computing device (not shown) for classifying a type of the vehicle and a toll collection. Then, the computing device classifies the type of vehicle by comparing the computed height and width of the vehicle with the previously stored value for the height and width according to types of vehicles, and automatically collects a toll according to the vehicle type classification.

According to the vehicle type classification result, if a vehicle is checked as a violated one traveling by using an OVU (On Vehicle Unit) of a different type of vehicle, a camera unit (not shown) is driven to photograph a number plate of the violated vehicle.

The operation of the first embodiment of the present invention will now be described in detail.

Figure 17:
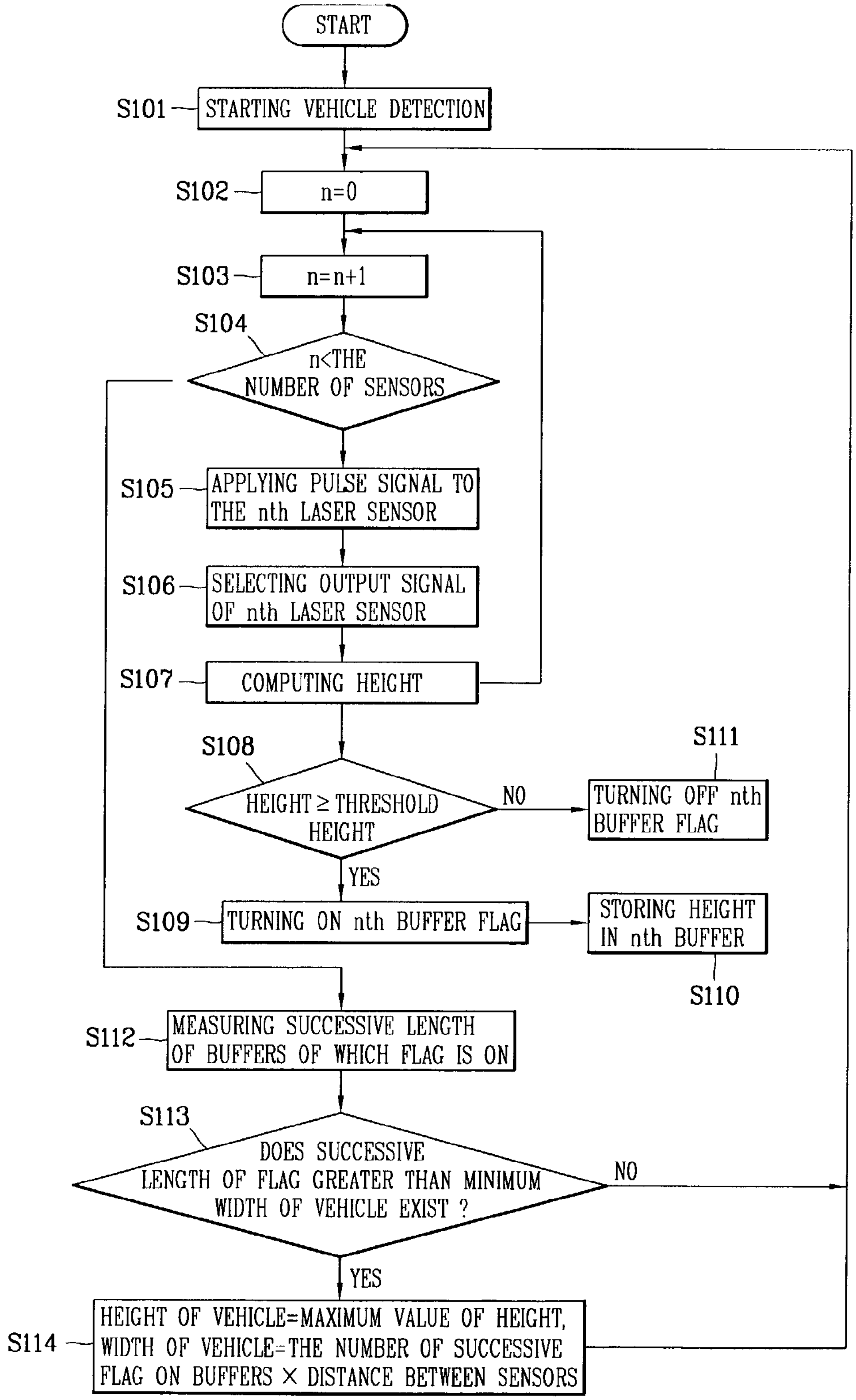
FIG. 17 is a flow chart of a vehicle measuring method in accordance with a first embodiment of the present invention.

FIG. 17 is a flow chart of a vehicle measuring method in accordance with a first embodiment of the present invention.

First, when power is applied to the vehicle measuring apparatus according to the invention, each of the laser sensors LS1–LSn receives a current or a voltage for emitting a laser light and starts measuring a vehicle (step S101).

Thereafter, in order to transmit a pulse signal generated from the pulse generator 41 to an effective laser sensor among the laser sensors LS1–LSn, a select signal for selecting an output terminal of the multiplexer 43 is set as an initial value '0' (n=0) (step S102).

The pulse signal is sequentially applied to the laser sensors LS1–LSn by using the count value (n=n+1) of the pulse counter 42, and it is determined whether the pulse signal has been applied to the final laser sensor LSn and 1 period of vehicle measuring operation has been completed (step S104).

If the 1 period of measuring operation is not completed yet, the pulse signal is applied to the nth laser sensor (LSn) by using the value (n) which is changed by the pulse counter 41 (step S105). In this case, the laser sensors LS1–LSn are disposed in an array form and sequentially driven, to thereby measure a distance.

Meanwhile, in the case that the laser sensors LS1–LSn are disposed in the array form to measure the distance, if the adjacent sensors are simultaneously operated, an inter-interference may be caused or a reflected wave of a wave that other sensor emits may be received. Thus, in order to sequentially operated the laser sensors LS1–LSn one by one, the multiplexer 43 is driven by using the count value of the pulse counter 42. At this time, the pulse signal is transmitted to the nth laser sensor LSn, and the laser emitter 21 of the nth laser sensor LSn emits laser light as much as time corresponding to the width of the pulse signal.

In order to receive the signal from the laser receiver 24 of the laser sensors LS1–LSn, a switch corresponding to the count value 'n' of the pulse counter 42 among the switches 44-1~**44-*n* is turned on, so as to receive an output signal (a signal corresponding to the reflected light) of the laser receiver 24 of the corresponding laser sensor (step S106**).

The lapse time is measured by using the inputted output signal and the height of the object on the road is computed by using the measured lapse time (step S107). In the step S107, the value measured in the initialization process, that is, the distance value corresponding lapse time stored corresponding to the measured lapse time is subtracted from a distance value from the laser sensor to the road surface when no vehicle is on the road, to compute the height of the object on the road.

If the computed height of the object on the road is greater than the reference height (a predetermined threshold value), the flag of the nth buffer is turned on (that is, it is set as '1') and the measured height value of the buffer is recorded. If, however, the measured height is smaller than the threshold height, the nth flag is turned off (steps S108~S111).

If one period of measurement is finished in the step S104, that is, one time of operation of each of the laser sensors LS1–LSn is finished, the successive length that the corresponding flags are ON is measured by using the flag value currently stored in the buffer is measured and lengths not less than another threshold value, that is, the minimum width that can be determined as a vehicle, are all recorded (step S112).

If there are data with said successive length, the height, width and position of the vehicle are determined by using the data (S113~S114).

Thereafter, it returns to the initial operation step (step S102) of the multiplexer unit 32 and the same steps (S101~S114) are performed on the next vehicle.

In the second embodiment of the present invention, in operating simultaneously different groups of laser sensors after grouping laser sensors which are within the maximum distance in which an interference is made to each other, the laser sensors in the same group are sequentially operated, so that a high speed processing is possible.

The vehicle measuring apparatus in accordance with the second embodiment of the present invention will now be described with reference to FIG. 18.

Figure 18:
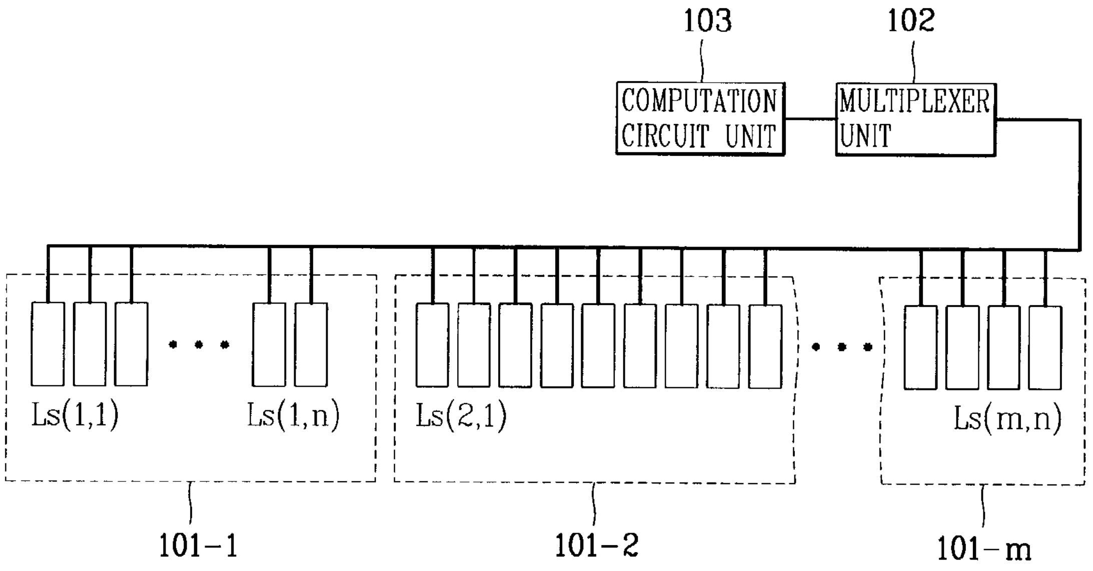
FIG. 18 illustrates a major part of a vehicle measuring apparatus in accordance with the second embodiment of the present invention.

FIG. 18 illustrates a major part of a vehicle measuring apparatus in accordance with the second embodiment of the present invention.

With reference to FIG. 18, the vehicle measuring apparatus in accordance with the second embodiment of the present invention comprises 'm' number of laser sensor groups 101-1~101-*m* for grouping 'n' number of laser sensors corresponding to entire roadway width; a multiplexer unit 102 for outputting a pulse signal for sequentially driving laser sensors in the same group while driving laser sensors of different groups among the laser sensor groups 101-1~101-*m* simultaneously, and for receiving a signal for measuring a vehicle outputted from the laser sensors 101-1~101-*m*; and a computation circuit unit 103 for measuring a lapse time on the basis of the pulse signal generated from the multiplexer unit 102 and the signal for measuring a vehicle received from the multiplexer unit 102, and computing height and width of the vehicle on the basis of the measured lapse time and the installation information of the laser sensors 101-1~101-*m*.

The 'm' number of laser sensor groups 101-1~101-*m* includes 'n' number of laser sensors (LS1-1~LS1-*n*) (LS2-1~LS2-*n*), . . . , (LSn-1~LSm-n), respectively, and each of the laser sensors (LS1-1~LS1-*n*), . . . , (LSm-1~LSm-n) has the construction as shown in FIG. 9 as described above.

The multiplexer unit 102 and the computation circuit unit 103 will now be described in detail with reference to FIG. 19.

Figure 19:
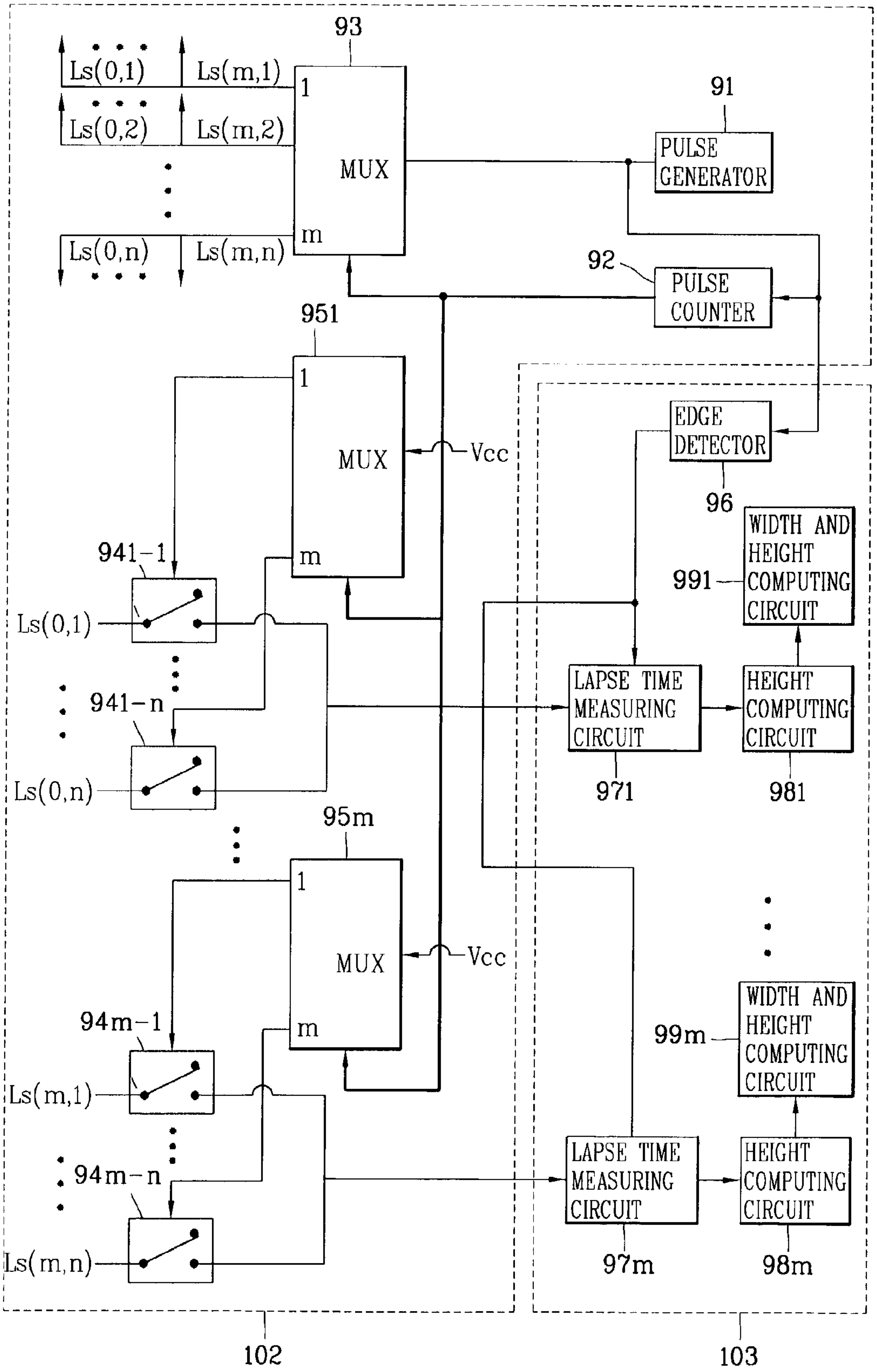
FIG. 19 is a block diagram showing the construction of a multiplexer and a computation circuit in accordance with the second embodiment of the present invention.

As shown in FIG. 19, the multiplexer unit 102 comprises a pulse generator 91 for generating a pulse signal to drive the laser sensors 101-1~101-*m* ; a pulse counter 92 for counting the pulse signals generated from the pulse generator 91; a multiplexer 93 for outputting the pulse signal generated from the pulse generator 91 simultaneously in parallel to each of the laser sensor groups 101-1~101-*m* and sequentially one by one to the laser sensors (LS1-1~LS1-*n*), . . . , (LSm-1~LSm-n) of the same laser sensor groups (101-1~101-*m*); switches (841-1~941-*n*), . . . , (94*m*-1~94*m*-*n*) installed corresponding to the laser sensors (LS1-1~LS1-*n*), . . . , (LSm-1~LSm-n) and providing a signal for measuring a vehicle outputted from the laser sensors (LS1-1~LS1-*n*), . . . , (LSm-1~LSm-n) to the computation circuit unit 103; and multiplexers 951~95*m* for selectively operating the switch corresponding to the laser sensor to which the multiplexer 83 has transmitted a pulse signal among the switches (941-1~941-*n*), . . . , (84*m*-1~94*m*-*n*) according to the count output signal from the pulse counter 92.

The pulse counter 92 can be constructed to be automatically reset when the pulse generated from the pulse generator 91 reaches to a previously set count limitation value, that is, when one operation period of the vehicle measurement is completed after operating all the laser sensor as installed.

In addition, in order to correspond the count value of the pulse counter 92 to the number of laser sensors, a separate circuit for comparing the count value of the pulse counter 92 a pre-set limitation value and resetting the pulse counter 92 if the two values are identical to each other can be additionally installed in the multiplexer unit 102.

The switches 941-1~941-*n*, . . . , 94*m*-1~94*m*-*n* can be constructed as transistors which are turned on by a constant voltage Vcc.

The computation circuit unit 103 processes simultaneously in parallel the information for vehicle measurement received from each of the laser sensors (101-1~101-*m*) on the basis of the pulse signal generated from the multiplexer unit 102 and the signal for vehicle measurement received at the multiplexer unit 102.

As shown in FIG. 19, the computation circuit unit 103 includes an edge detector 96 for detecting an edge of the pulse signal generated by the pulse generator 91 and for providing an instruction signal for instructing initiating of lapse time measurement from a light emitting time point to light receiving time point of the laser sensors (LS1-1~LS1-*n*), . . . , (LSm-1~LSm-n); a plurality of lapse time measuring units (971~97*m*) provided corresponding to the laser sensors (LS1-1~LS1-*n*), . . . , (LSm-1~LSm-n) and for measuring a lapse time from the light emitting time point to the light receiving time point of the laser sensors on the basis of the instruction signal provided from the edge detector 96 and the output signal outputted from the switches (941-1~941-*n*), . . . , (94*m*-1~94*m*-*n*); height computing circuits (981–98*m*) installed corresponding to the laser sensors (LS1-1~LS1-*n*), . . . , (LSm-1~LSm-n), and for computing height of a object on the road with reference to the lapse time measured by the lapse time measuring units (971~97*m*), the measured distance from the laser sensors to the road surface as stored corresponding to each lapse time, and a measured distance from the laser sensor to the object on the road; and a plurality of width and height computing circuits 991~99*m* for computing width and height of the vehicle by computing the number of laser sensors (LS1–LSn) corresponding to the height information of the object computed from the height computing circuit 48 and calculating a final vehicle width by comparing the computed vehicle width information with a previously stored minimum vehicle width and height information.

In the second embodiment of the present invention, as for the process time taken for calculating the height and width of the vehicle, since the laser sensors (LS1~LSn) are grouped to 'm' number of groups and processed simultaneously in parallel, its process time can be reduce to '1/m' of the process time for calculating the height and width of the vehicle as in the first embodiment. Here, 'm' is the number of laser sensor groups.

The operation and effect of the vehicle measuring apparatus in accordance with the second embodiment of the present invention will now be described in detail.

First, the pulse signal generated from the pulse generator 91 is a DC pulse signal with a high potential vale of DC 5V and a low potential value of 0V and outputted to the multipelxer 93 and at the same time outputted to the pulse counter 92 and the edge detector 96 to drive the laser emitter 21 provided in each of the laser sensors. 101-1~101-*m*.

When the edge detector 96 detects a rising edge of the pulse signal generated from the pulse generator 91, it outputs an instruction signal to initiate the lapse time measurement to the lapse time measuring circuits 971~97m.

Thereafter, the pulse counter 92 counts the number of pulses of the pulse signal generated from the pulse generator 91 until when it reaches the preset count limitation value identical to the number of laser sensors.

The multiplexer 93 outputs the pulse signal generated from the pulse generator 91 according to the count value of the pulse counter 92 simultaneously in parallel to the plurality of laser sensor groups 101-1~101-*m* and sequentially one by one to the laser sensors (LS1-1~LS1-*n*), . . . , (LSm-1~LSm-n) in the same laser sensor groups (101-1~101-*m* ). Thus, the plurality of laser sensor groups (101-1~101-*n*) are simultaneously driven while the laser sensors (LS1-1~LS1-*n*), . . . , )(LSm-1~LSm-n) in the same laser sensor groups (101-1~101-*m*) are driven sequentially one by one. At this time, the laser emitter 21 provided in each of the laser sensors (LS1-1~LS1-*n*), . . . , (LSm-1~LSm-n) emits laser light when the pulse signal generated from the pulse generator 91 has a high potential.

For example, if the pulse count value of the pulse counter 92 is '1', the multiplexer 93 applies the pulse signal received from the pulse generator 91 to the first laser sensors (LS1-1, LS2-1, . . . , LSm-1) provided in each of the laser sensor groups (101-1~101-*m*) to drive them. At this time, the first laser sensors (LS1-1, LS2-1, . . . , LSm-1) emit laser light. At this time, the multiplexers (951~95*m*) turn on the switches (941-1, 942-1, . . . , 94*m*-1) corresponding to the count value '1' of the pulse counter 92 and outputs an output signal corresponding to the laser light that the first laser sensors (LS1-1, LS2-1, . . . , LSm-1) receive to the computation circuit unit 103. The output signal outputted from the first laser sensors (LS1-1, LS2-1, . . . , LSm-1) is outputted as an instruction signal for terminating the lapse time measurement to the lapse time measuring units (971~97*m*).

If the pulse count value is 'n', the multiplexer 93 outputs the pulse signal to the nth laser sensors (LS1-N, LS2-*n*, . . . , LSm-n) to emit laser light, and at the same time, the multipelxers 951~95*m* turn on the switches 941-*n*, 942-*n*, . . . , 94*m*-*n*) to output the output signal as an instruction signal for terminating the lapse time measurement to the lapse time measuring units 971~97*m*.

The lapse time measuring units 971~97*m* measure the lapse time from the light emitting time point to the light receiving time point for each laser sensors (LS1-1~LS1-*n*), . . . , (LSm-1~LSm-n) of the laser sensor groups (101-1~101-*m*) in response to the instruction signal outputted from the edge detector 95 and the output signals sequentially outputted from the switches (941-1~941-*n*), . . . , (94*m*-1~94*m*-*n*), and outputs the measured lapse time to the height computation circuits 981~98*m*).

The lapse time measuring circuits 971~97*m* are constructed in the same manner as that of the edge detector as illustrated in FIG. 12 or 13, for which descriptions are omitted.

The height computation circuits 981~98*m* calculate the height of the object on the road with reference to the lapse time measured by the lapse time measuring unit 971~97*m* and outputs the measured height information of the object to the width computation circuits 991~99*m*.

The height computation circuits 981~98*m* have the same construction as that of the height computation circuit illustrated in FIG. 14, for which descriptions are omitted.

The width computation circuits 991~99*m* compute the height and width of the vehicle on the road by using equation (2)~equation (7).

The width and height computation circuits 991~99*m* have the same construction as that of the width computation circuit illustrated in FIG. 16, for which detailed descriptions are omitted.

Accordingly, in the second embodiment of the present invention, the width, height and position information of the vehicle computed through the above process is outputted to a computing device (not shown) for classifying a type of the vehicle and a toll collection. Then, the computing device classifies the type of vehicle by comparing the computed height and width of the vehicle with the previously stored value for the height and width according to types of vehicles, and automatically collects a toll according to the vehicle type classification.

In the second embodiment of the present invention, according to the vehicle type classification result, if a vehicle is checked as a violated one traveling by using an OVU (On Vehicle Unit) of a different type of vehicle, a camera unit (not shown) is driven to photograph a back number plate of the violated vehicle, likewise in the first embodiment of the present invention.

A vehicle measuring method in accordance with the second embodiment of the present invention will now be described in detail with reference to FIGS. 20A and 20B.

Figure 20A:
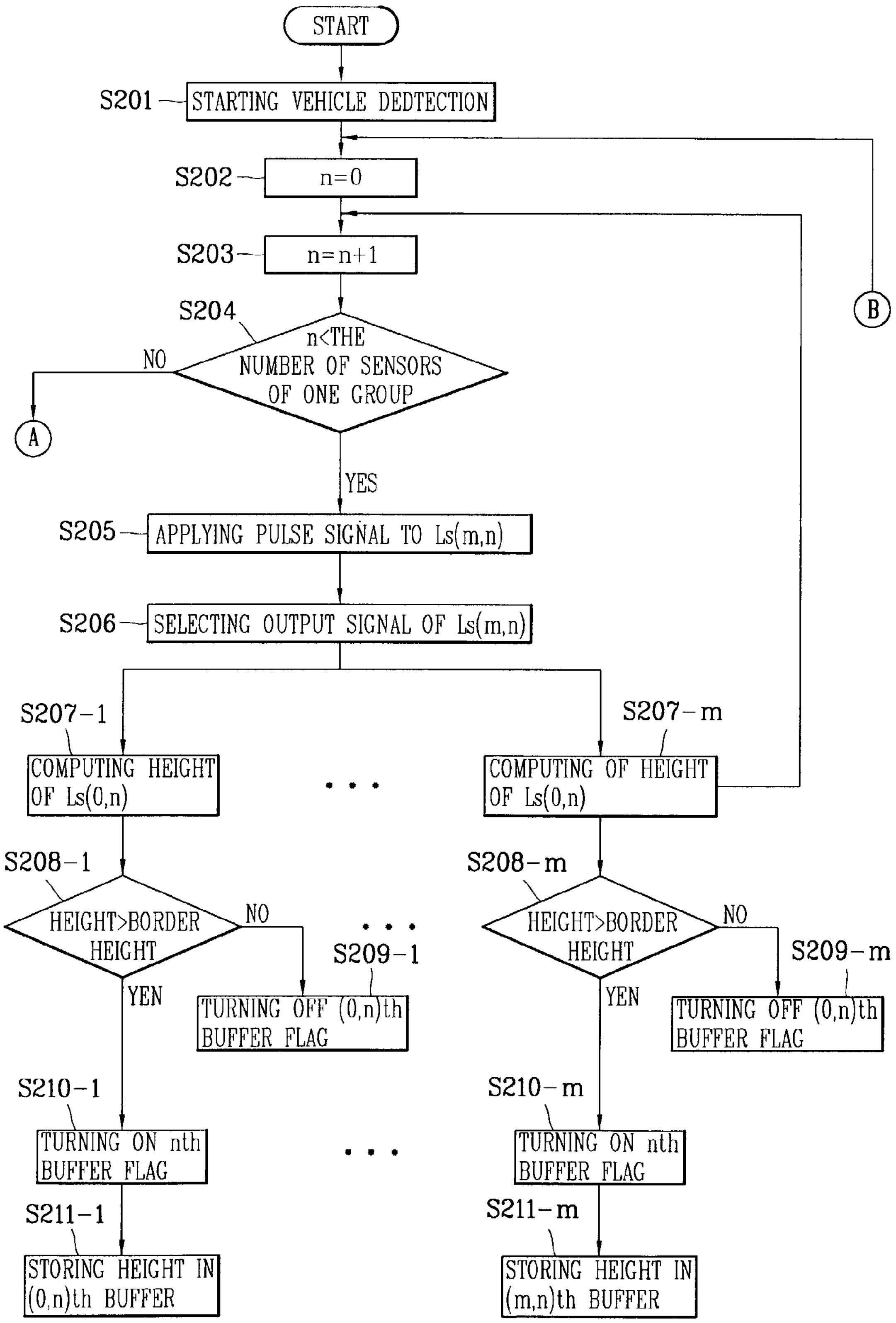
FIGS. 20A and 20B are a flow chart of a vehicle measuring method in accordance with the second embodiment of the present invention.
Figure 20B:
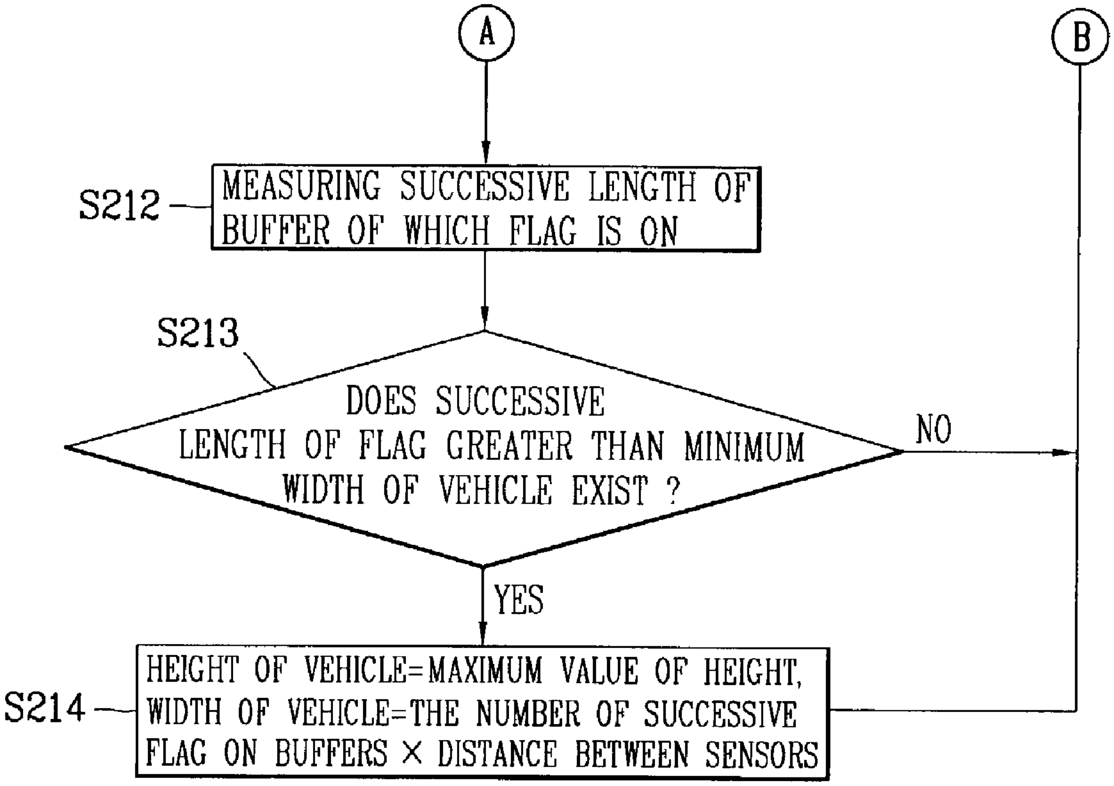

FIGS. 20A and 20B are a flow chart of a vehicle measuring method in accordance with the second embodiment of the present invention.

First, each of the laser sensors (LS1-1~LS1-*n*), . . . , (LSm-1~LSm-n) receives a driving voltage for emitting laser and starts measuring a vehicle (step S201).

In order to transmit the pulse signal generated from the pulse generator 91 to a corresponding laser sensor through the multiplexer 93, a select signal (n) for switching the operation of the multiplexer 93 is set as an initial value '0'.

The pulse signal is applied simultaneously in parallel to the nth laser sensor of each of the laser sensor groups (101-1~101-*n*) by using the count value (n=n+1) of the pulse counter 92 (steps S203, S204, S205).

In order to prevent a mutual interference between laser sensors in the same group in the steps S203, S204 and S205, the multiplexer 93 is operated by the count value of the pulse counter 92 so that only one laser sensor in the same group can be operated. That is, the pulse signal is simultaneously inputted into the laser sensors 101-1~101-*m*, and 'n' number of laser sensors installed in each of the laser sensor groups (101-1~101-*m*) receive one by one sequentially the pulse and emits laser light as long as time corresponding to the width of the pulse signal.

In order to receive reflected light of the laser light emitted in the step S205, switches corresponding to the current laser sensor the multiplexer 951~95*m* have selected according to the count value (n) of the pulse counter 92 are simultaneously turned on among the switches (941-1~941-*n*), . . . , (94*m*-1~94*m*-*n*), to output the output signals outputted from the laser receiver 24 of the corresponding laser sensors to the lapse time measuring units 971~97*m* (step S206).

The lapse time measuring units 971~97*m* measure the lapse time by using the output signal outputted in the step S206, and the height computing circuits 981~98*m* compute the height of the object on the road by using the measured lapse time. That is, the height computing circuits 981~98*m* converts each lapse time simultaneously measured for the nth laser sensors (LS1-N, . . . , LSm-n) installed in each of the laser sensor groups (101-1~101-*m*) into a distance value by using the lapse time distance value and subtracts the converted distance values from the height value up to the road surface, thereby calculating the height of the object on the road (steps S207-1~S207-*m*).

If the calculated height of the object on the road is greater than a threshold height, the width computing circuits (991–99*m*) turn on a corresponding flag of the flag buffer 82 and stores the vehicle height value in the height buffer 83. If, however, the vehicle height value is smaller than the threshold height, the width computing circuits 991~99*m* turn off only the corresponding flag of the flag buffer 82 (S208-1~S208-*m*, S209-1~S209-*m*, S210-1~S210-*m*, S211-1~S211-*m*).

If the 'n' in the step S204, when 'n' number of laser sensors are completed one by one by the laser sensor groups 101-1~101-*m*, that is, when one period of the measurement operation is completed, the flag value currently stored in the flag buffer 82 is checked to measure a successive length that the flags are ON. That is, the length not less than the minimum width which can be determined as a vehicle is measured (step S212).

If there is a data with a successive length, the width computing circuits (991~99*m*) determine height and width of the vehicle by using the length values (steps S213, S214). Thereafter, when the process is terminated, it returns to the step S202 to perform the steps S201~S214 for a next entering vehicle to calculate height and width of the vehicle.

As so far described, the vehicle measuring apparatus and method of the present invention has the following advantages.

That is, for example, first, since a vehicle is measured by a non-contact method by using a laser sensor, the height and width of the vehicle moving at a high speed can be accurately measured without its slow moving or stop. Thus, a problem of vehicle congestion can be solved.

Second, the laser sensor is installed separated with a certain height from the ground of the road, it is not necessary to widen the road in order to install an auxiliary means such as a traffic island for inducing a vehicle to pass a sensor-buried road surface. Thus, a construction cost can be reduced.

Third, since the height and width of the vehicle are measured with reference to installation information previously stored for a plurality of laser sensors which are installed closely to each other corresponding to the width of every road way on the road and a lapse time from the light emitting time point and light receiving time point of each laser sensor, a detection line or pattern or an intermittent marking region is not necessary on the road.

Fourth, since the laser light which gets minor influence on straight-traveling characteristic of the emission and reflection even in a bad weather of raining or snowing, an error in the vehicle measuring can be minimized.

Fifth, since the laser sensor is installed separated with a certain height from the ground of the road and since the height and width of the vehicle are measured on the basis of installation information previously stored for a plurality of laser sensors which are installed closely to each other corresponding to the width of every road way on the road and a lapse time from the light emitting time point and light receiving time point of each laser sensor, height and width of a vehicle can be accurately measured while allowing vehicles moving in every road way to freely change its running lane.

Sixth, since the height and width of the vehicle are measured on the basis of installation information of laser sensors and a lapse time from the light emitting time point and light receiving time point of each laser sensor, the width of a moving vehicle can be measured by the unit of length, not the unit of angle. Thus, the computation process can be simplified.

Seventh, since the plurality of laser sensors are installed closely to each other corresponding to the width of every road way on the road and insolated with a predetermined height from the road surface, the width of the moving vehicle can be accurately measured regardless of a type of the moving vehicle.

Lastly, all the laser sensors are grouped into a plurality of groups such that adjacent laser sensors within a minimum distance with which laser sensors are not affected by each other's reflection wave are grouped, and then a pulse signal is applied in parallel to the plurality of groups, so that a vehicle measuring time can be shortened.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A vehicle measuring apparatus comprising:

a plurality of laser sensors separated at a first predetermined height from a road surface of a road and installed closely to each other along a line covering a width of a plurality of lanes of the road, and for providing a signal to measure the vehicle; and processor means electrically connected to the laser sensors for computing a, height and a width of the vehicle based on the signal received from the laser sensors and previously stored installation information of the plurality of laser sensors, the processing means including means for obtaining a value based on the signal received from each one of the plurality of laser sensors, any one of the plurality of laser sensors with the value larger than a second predetermined height defining a qualified laser sensor; and means for computing the width of the vehicle based on a number of the qualified laser sensors.

2. The apparatus of claim 1, wherein each of the plurality of laser sensors comprising:

a laser emitter for emitting laser light onto the road surface; and a laser receiver for receiving laser light reflected from the road surface or from the vehicle on the road, and for providing the processor means with a signal to measure the vehicle depending on receiving the reflected laser light.

3. The apparatus of claim 2, wherein each of the plurality of laser sensors further comprise a reflection plate for reflecting the laser light received from the laser emitter onto the road surface.

4. The apparatus of claim 2, wherein each of the plurality of laser sensors further comprise a lens for collecting the laser light reflected from the road surface or from the vehicle on the road and for providing the laser light to the laser receiver.

5. The apparatus of claim 1, wherein the processor means comprising:

a multiplexer for generating a drive signal to drive the laser sensors, for applying simultaneously the generated drive signal to the plurality of laser sensors, and for receiving signals to measure the vehicle from the plurality of laser sensors; and a computation circuit for computing the height and the width of the vehicle with reference to the driving signal generated from the multiplexer, the vehicle measurement signal received by the multiplexer and the installation information of the plurality of laser sensors.

6. The apparatus of claim 1, wherein the processor means comprises:

a multiplexer for generating a drive signal to drive the laser sensors, for applying selectively the generated drive signal to the plurality of laser sensors, and for selectively receiving signals to measure the vehicle from the plurality of laser sensors; and a computation circuit for computing the height and the width of the vehicle based on the signal for vehicle measurement received from the multiplexer unit, and the installation information of the plurality of laser sensors.

7. The apparatus of claim 6, wherein the multiplexer comprising:

a pulse generator for generating a pulse signal to drive the laser sensors;

a pulse counter for counting the pulse signals generated from the pulse generator;

a first multiplexer for sequentially outputting the pulse signal generated from the pulse generator to the plurality of laser sensors according to a pulse count value from the pulse counter;

a plurality of switch units installed corresponding to the plurality of laser sensors and being switched to a position for providing the signal for vehicle measurement outputted from the plurality of laser sensors or a position for cutting off the signal for vehicle measurement; and a second multiplexer for selectively operating a switch unit corresponding to a laser sensor to which the first multiplexer has outputted the pulse signal among the plurality of switching units according to the pulse count value from received from the pulse counter.

8. The apparatus of claim 6, wherein the computation circuit comprising:

an edge detector for detecting an edge of the pulse signal generated from the pulse generator and for providing an instruction signal to initiate measurement of a lapse time from a light emitting time point to a light receiving time point of laser sensors;

a lapse time measuring unit for measuring a lapse time from the light emitting time point to the light receiving time point of the laser sensors according to the instruction signal provided from the edge detector and the signal for the vehicle measurement received from the switch unit;

a first computing unit for computing a height of an object on the road based on the lapse time measured by the lapse time measuring unit; and a second computing unit for computing the height of the vehicle based of the height information of the object on the road computed by the first computing unit and previously stored minimum height information.

9. The apparatus of claim 1, wherein the processor means comprising:

a multiplexer for simultaneously driving a plurality of laser sensor groups corresponding to the width of the road by generating a pulse signal for driving the laser sensors, for transmitting simultaneously in parallel the pulse signal to each laser sensor group so that the plurality of laser sensors belonging to the same laser sensor group being driven-able sequentially one by one, and for simultaneously receiving a signal outputted from each of laser sensor groups to measure the vehicle; and a computation circuit for computing the height and the width of the vehicle based on the pulse signal generated from the multiplexer, the signal for vehicle measurement received by the multiplexer and the installation information of the plurality of laser sensors.

10. The apparatus of claim 9, wherein the multiplexer comprising:

a pulse generator for generating a pulse signal for driving the laser sensors;

a pulse counter for counting the pulse signals generated from the pulse generator;

a first multiplexer for outputting simultaneously in parallel the pulse signal to the plurality of laser sensor groups each having the plurality of laser sensors which are adjacent within a distance that a mutual interference can occur, according to a pulse count value from the pulse counter, and for outputting sequentially one by one the pulse signal to the laser sensors in the same laser sensor group;

a plurality of switch units installed corresponding to the plurality of laser sensors belonging to each of the laser sensor groups, and for selecting a signal to measure the vehicle outputted from the laser sensors by the laser sensor groups and for outputting it to the computation circuit unit; and a second multiplexer provided corresponding to each of the laser sensor groups, and selectively operating the switch unit corresponding to a corresponding laser sensor by laser sensor groups to which the first multiplexer has transmitted the pulse signal among the plurality of switch units according to the pulse count value received from the pulse counter.

11. The apparatus of claim 9, wherein the computation circuit comprising:

an edge detector for detecting an edge of the pulse signal generated from the pulse generator and for providing an instruction signal to initiate measuring a lapse time from a light emitting time point to a light receiving time point of the plurality of laser sensors;

a lapse time measuring unit for measuring a lapse time from the light emitting time point to the light receiving time point of the laser sensors in response to the instruction signal provided from the edge detector and the signal received by the multiplexer unit to measure the vehicle;

a first computing unit for computing a height of an object on the road based on the lapse time measured by the lapse time measuring unit; and a second computing unit for computing the height based on the height information of the object on the road computed by the first computing unit and previously stored minimum height information.

12. The apparatus of claim 8 or 11, wherein the lapse time measuring unit comprising:

a pulse generator; and a pulse counter for initiating counting of pulses generated from the pulse generator in response to the instruction signal received from the edge detector, and for terminating the pulse counting in response to the signal received from the multiplexer unit to measure the vehicle and for outputting the lapse time to the first computing unit.

13. The apparatus of claim 8 or 11, wherein the lapse time measuring unit comprising:

a capacitor;

a charging current supplier for charging the capacitor in response to the instruction signal received from the edge detector and for stopping the charging of the capacitor in response to the signal received from the multiplexer to measure the vehicle;

a voltage detector for measuring a charged voltage of the capacitor;

a lapse time information storing unit for providing a previously stored lapse time data corresponding to the capacitor charge voltage; and a means for reading the lapse time data corresponding to the capacitor charged voltage from the lapse time information storing unit, and for outputting the read lapse time data to the first computing unit.

14. The apparatus of claim 1, wherein the installation information of the laser sensors includes distance information between the plurality of laser sensors.

15. The apparatus of claim 14, wherein the distance information between the laser sensors includes length information towards a road width direction of the laser sensor or information of a value obtained by adding an installation interval between laser sensors to the length towards the road width direction of the laser sensor.

16. The apparatus of claim 1, wherein the signal to measure the vehicle includes an information signal of a lapse time from a time point that laser light is emitted from the plurality of laser sensors onto the road surface or onto the vehicle on the road to a time point that laser light reflected from the road surface or the vehicle on the road is received by the laser sensors.

17. The apparatus of claim 1, wherein the means for computing the width of the vehicle computes the width of the vehicle by summing a width of each of the qualified laser sensors and a width of a gap between two adjacent qualified sensors of the qualified laser sensors.

18. A vehicle measuring method comprising the steps of:

sequentially driving a plurality of laser sensors separated from the a road surface of a road at a first predetermined height and installed closely to each other along a line covering a width of a plurality of lanes on the road;

measuring a lapse time from a time point of emitting a laser light from the plurality of laser sensors to a time point of receiving light;

calculating a distance corresponding to the measured lapse time;

computing a height and of a vehicle based on the calculated distance value;

counting a number of qualified laser sensors, the qualified laser sensor being any of the plurality of laser sensors with the calculated distance value larger than a second predetermined height; and computing a width of the vehicle based on the number of qualified laser sensors and installation information of the plurality of laser sensors.

19. The method of claim 18, wherein the computing width step further comprises computing the width of the vehicle by summing a width of each of the qualified laser sensors and a width of a gap between two adjacent qualified sensors of the qualified laser sensors.

20. A vehicle measuring method comprising the steps of:

grouping a plurality of laser sensors separated from a surface of a road at a first predetermined height and installed closely to each other along a line covering a width of a plurality of lanes on the road into a plurality of groups corresponding to each of the plurality of lanes;

sequentially driving the plurality of laser sensors in a group one by one and simultaneously driving the plurality of laser sensor groups;

measuring a lapse time from a time point of emitting a laser light emitted from the plurality of laser sensors according to driving of the plurality of laser sensors to a time point of receiving light;

calculating a distance corresponding to the measured lapse time;

computing a height of a vehicle on the base of the calculated distance value; and counting the number of qualified laser sensors, the qualified laser sensor defining one of the plurality of laser sensors with the calculated distance value larger than a second predetermined height; and computing a width of the vehicle based on the number of qualified laser sensors and installation information of the plurality of laser sensors.

21. The method of claim 20, wherein the computing width step further comprises computing the width of the vehicle by summing a width of each of the qualified laser sensors and a width of a gap between two adjacent qualified sensors of the qualified laser sensors.

* * * * *